United States Patent
Li et al.

(10) Patent No.: US 11,790,742 B2
(45) Date of Patent: Oct. 17, 2023

(54) SUPERVISED DELIVERY TECHNIQUES

(71) Applicant: Alarm.com Incorporated, Tysons, VA (US)

(72) Inventors: Michael Li, Tysons, VA (US); Daniel Todd Kerzner, McLean, VA (US); Allison Beach, Leesburg, VA (US); Abraham Joseph Kinney, Vienna, VA (US); Donald Madden, Columbia, MD (US); Jeffrey A. Bedell, Arlington, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/569,033

(22) Filed: Jan. 5, 2022

(65) Prior Publication Data

US 2022/0130149 A1   Apr. 28, 2022

Related U.S. Application Data

(63) Continuation of application No. 16/835,834, filed on Mar. 31, 2020, now Pat. No. 11,250,270, which is a
(Continued)

(51) Int. Cl.
*G06V 20/00* (2022.01)
*G08B 13/196* (2006.01)
(Continued)

(52) U.S. Cl.
CPC ... *G08B 13/19645* (2013.01); *G06Q 10/0833* (2013.01); *G06V 20/41* (2022.01);
(Continued)

(58) Field of Classification Search
CPC ........ G06V 20/52; G06V 40/20; G06V 10/40; G06V 20/44; G06V 20/41;
(Continued)

(56) References Cited

U.S. PATENT DOCUMENTS 5,834,706 A   11/1998   Christ
6,344,796 B1   2/2002   Ogilvie et al.
(Continued)

OTHER PUBLICATIONS

International Search Report and Written Opinion in International Application No. PCT/US2018/025349, dated Jun. 14, 2018, 15 pages.
(Continued)

*Primary Examiner* — Li Liu
(74) *Attorney, Agent, or Firm* — Fish & Richardson P.C.

(57) ABSTRACT

Systems and techniques are described for supervising and monitoring the delivery of a package to a property. In some implementations, shipment data indicating a package to be delivered at the property and identification information for a first person is obtained. A request for a second person to access the property and deliver the package that includes identification information for the second person is received. Identification information for the first person is compared to the identification information for the second person. Access to the property is provided to the second person. Sensor data generated by one or more sensors that are located throughout the property and while providing access to the property is obtained and analyzed. A determination of whether the second person delivered the package to the property is made based on analyzing the sensor data. Data indicating the determination is provided for output.

20 Claims, 11 Drawing Sheets

Related U.S. Application Data continuation of application No. 15/910,327, filed on Mar. 2, 2018, now Pat. No. 10,643,079.

(60) Provisional application No. 62/479,731, filed on Mar. 31, 2017.

(51) Int. Cl.
| | |
|---|---|
| *G06Q 10/0833* | (2023.01) |
| *G08B 25/08* | (2006.01) |
| *G06V 20/52* | (2022.01) |
| *G06V 20/40* | (2022.01) |
| *G06V 40/20* | (2022.01) |
| *G06V 30/224* | (2022.01) |

(52) U.S. Cl.
CPC .............. *G06V 20/52* (2022.01); *G06V 40/20* (2022.01); *G08B 13/19613* (2013.01); *G08B 25/08* (2013.01); *G06V 20/44* (2022.01); *G06V 30/224* (2022.01)

(58) Field of Classification Search
CPC . G06T 2207/30196; G06T 2207/30232; G06T 7/292
See application file for complete search history.

(56) References Cited

U.S. PATENT DOCUMENTS

| | | |
|---|---|---|
| RE43,178 E | 2/2012 | Ghazarian |
| 9,244,147 B1 | 1/2016 | Soundararajan et al. |
| 10,388,092 B1 * | 8/2019 | Solh .................. G06V 20/00 |
| 2001/0045180 A1 * | 11/2001 | McCormick .......... A47G 29/141 |
| | | 109/53 |
| 2001/0051877 A1 * | 12/2001 | Steval ................. G06Q 20/382 |
| | | 705/64 |
| 2003/0034874 A1 | 2/2003 | Mann |
| 2003/0195814 A1 | 10/2003 | Strienner |
| 2004/0252017 A1 * | 12/2004 | Holding ................... G07C 9/33 |
| | | 340/5.9 |
| 2005/0165612 A1 | 7/2005 | Van Rysselberghe |
| 2005/0216553 A1 | 9/2005 | Mallonee et al. |
| 2005/0265582 A1 | 12/2005 | Buehler et al. |
| 2006/0100970 A1 | 5/2006 | Morony et al. |
| 2007/0005452 A1 * | 1/2007 | Klingenberg .......... G06Q 50/32 |
| | | 705/334 |
| 2007/0193834 A1 | 8/2007 | Pai et al. |
| 2008/0121682 A1 | 5/2008 | Grim et al. |
| 2008/0172261 A1 | 7/2008 | Albertson et al. |
| 2009/0166403 A1 | 7/2009 | Volpe et al. |
| 2009/0281929 A1 | 11/2009 | Boitet et al. |
| 2010/0123589 A1 | 5/2010 | Buck et al. |
| 2011/0130134 A1 | 6/2011 | Van Rysselberghe |
| 2013/0017812 A1 * | 1/2013 | Foster ................. H04L 12/2825 |
| | | 340/5.7 |
| 2015/0120015 A1 | 4/2015 | Fadell et al. |
| 2015/0120596 A1 | 4/2015 | Fadell et al. |
| 2015/0120598 A1 | 4/2015 | Fadell et al. |
| 2015/0120602 A1 | 4/2015 | Huffman et al. |
| 2015/0310381 A1 | 10/2015 | Lyman et al. |
| 2015/0317597 A1 | 11/2015 | Shucker et al. |
| 2016/0171435 A1 | 6/2016 | Newton et al. |
| 2016/0180667 A1 | 6/2016 | Bunker et al. |
| 2016/0275741 A1 | 9/2016 | Carstens et al. |
| 2016/0314429 A1 | 10/2016 | Gillen et al. |
| 2017/0236193 A1 | 8/2017 | Zundel et al. |
| 2017/0293883 A1 | 10/2017 | Li et al. |
| 2018/0165631 A1 * | 6/2018 | Romero ........... G08B 13/19697 |
| 2018/0165637 A1 * | 6/2018 | Romero ............ G06Q 10/0833 |

OTHER PUBLICATIONS

Extended European Search Report in European Application No. 18777914.5, dated Mar. 10, 2020, 10 pages.

EP Office Action in European Application No. 18777914.5, dated Aug. 14, 2023, 5 pages.

* cited by examiner

SUPERVISED DELIVERY TECHNIQUES

CROSS-REFERENCE TO RELATED APPLICATIONS

This application is a continuation of U.S. application Ser. No. 16/835,834, filed Mar. 31, 2020, now allowed, which is a continuation of U.S. application Ser. No. 15/910,327, filed Mar. 2, 2018, now U.S. Pat. No. 10,643,079, issued May 5, 2020, which claims the benefit of U.S. Provisional Patent Application No. 62/479,731, filed on Mar. 31, 2017 and titled "SUPERVISED DELIVERY TECHNIQUES." All of these prior applications are incorporated by reference in their entirety.

TECHNICAL FIELD

This disclosure relates to home monitoring technology.

BACKGROUND

Tracking technologies can be used for the observation of individuals and objects for particular periods of time. In security and monitoring applications, tracking technologies can be used to perform surveillance on a property.

SUMMARY

Many shipment monitoring technologies enable users such as shippers and purchasers the ability to locate and secure cargo at any point in the shipment and delivery supply chain. For example, many shipment monitoring technologies provide users with periodic status updates in response to the occurrence of a milestone (e.g., a package being shipped by the shipper, a package being received by at a shipment processing center, a package being sent out for delivery, and after the package being delivered at to the shipment destination).

However, if a package recipient is remote from the property, such status updates are often limited to the external environment of a property because operators of package delivery companies are unable to enter an unoccupied property due to potential security concerns. As a result, when a user is remote from the property, deliveries of environment-sensitive packages (e.g., fresh food that requires refrigeration and/or other perishable items) often reduce the quality of the delivered package. Other types of delivery complications can also exist when a package is delivered to an unoccupied property (e.g., incomplete deliveries because a shipper requires a receipt signature, deliveries that are susceptible to theft or damage because they are left outside the property).

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

In the drawings, like reference numbers represent corresponding parts throughout.

DETAILED DESCRIPTION

Figure 1A:
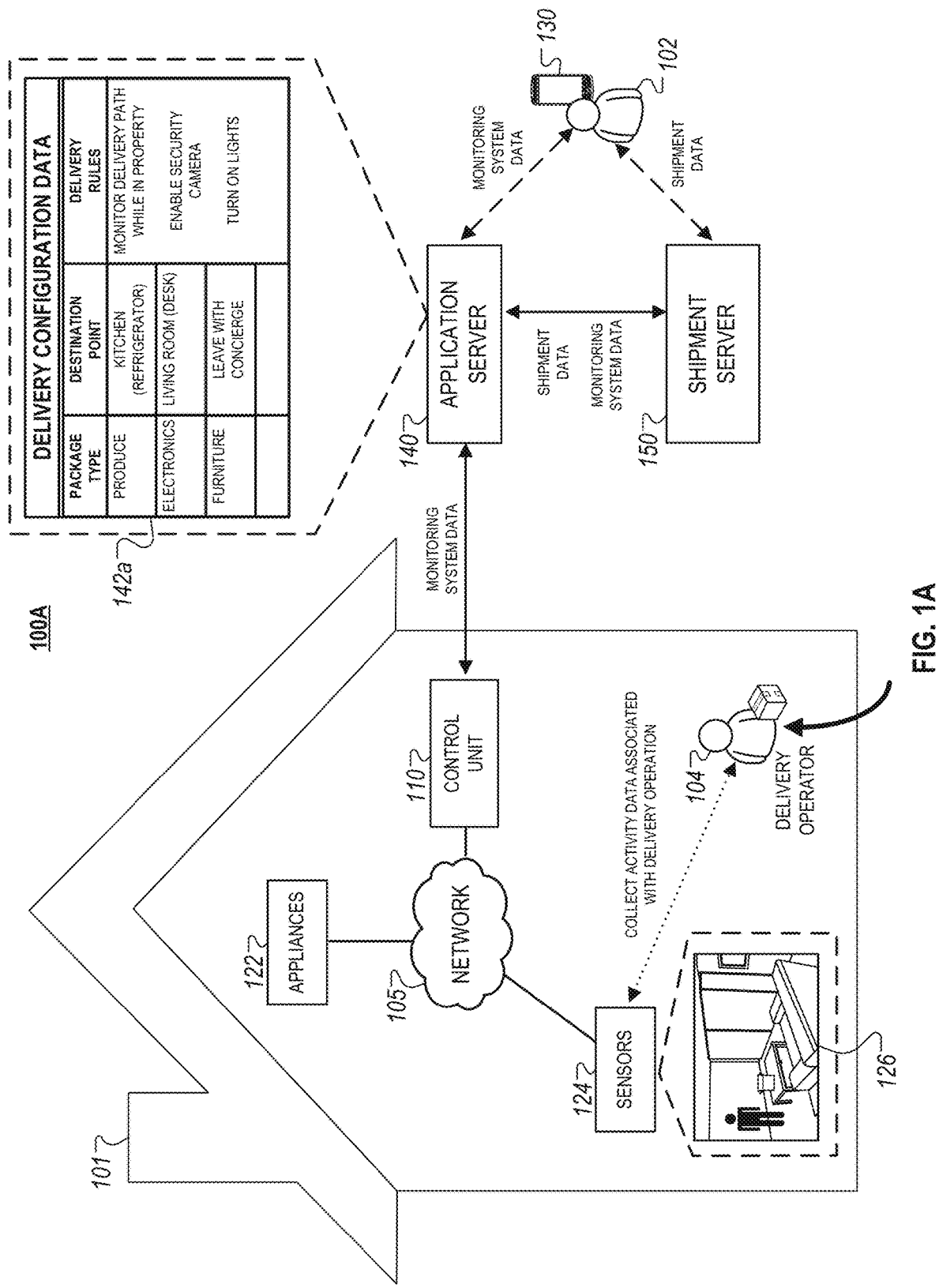
FIGS. 1A and 1B illustrate examples of systems that are capable of using techniques to supervise delivery personnel within an indoor environment of a property.

In general, systems and techniques are described for supervising and monitoring the delivery of a package to a designated location within an indoor environment of a property. To accomplish this, a system is capable combining spatial recognition techniques to characterize an indoor environment of the property, and security monitoring techniques to ensure that an operator that performs the delivery along a delivery route from the property entrance to a destination point within the indoor environment of the property.

An example of a supervised delivery operation proceeds as follows. The system initially verifies the identity of the operator near the exterior of the property. The system then permits the operator to enter the property once his/her identity has been verified. The system provides the operator with a delivery route that identifies the destination point (e.g., the refrigerator in the kitchen) where the package is to be placed. The system monitors the activity and/or movement of the operator according to a set of delivery rules to determine, for example, if the operator remains within a permissible area of the property (e.g., a property region included in the delivery route), has entered into a restricted region of the property (e.g., a bedroom that is not included in the delivery route), or has performed an unauthorized action (e.g., removing an object in the property that is under surveillance). The system monitors the indoor environment of the property to determine when the package has been placed at the destination point. The system finally guides the operator out of the property and provides a notification to the occupant that the delivery has been completed and that the operator has left the property premises.

As described in greater detail below, the system is capable of using spatial monitoring techniques to characterize an indoor environment of a property. The system generates a three-dimension spatial model for the indoor environment.

For example, the three-dimensional spatial model can represent spatial information (e.g., depth, topology, etc.) of the indoor environment that identifies detected boundaries. The system also uses heuristic and/or object detection techniques to identify and extract features that are present within the three-dimensional spatial model. For example, the system can detect boundaries that represent walls, identify objects that represent movable or fixed furniture, use geospatial scanning techniques to identify doors and windows, and/or extract color or texture information associated with different physical objects and surfaces in the property. The system generates two-dimensional representation of the property that includes spatial information from the three-dimensional spatial model and the extracted features. For example, the system can generate a top-view floor plan for the indoor environment of the property that identifies walls, furniture, and objects/locations of interest. In other examples, the system generates an interactive three-dimensional representation (or a combination of a two-dimensional and three-dimensional representation) of the property. In each of these examples, the property representation can indicate a topology of the indoor environment of the property (e.g., locations of objects, points of interest, and arrangement of property features such as doors or windows).

Once the system has obtained spatial information of the indoor environment of the property, the system can perform various post-processing operations that improve the supervision of a delivery operation. For example, in some implementations, the system uses three-dimensional spatial information to identify optimal camera placement for a particular delivery route such that a greatest portion of the delivery route are viewable within the field of view of one or more security cameras. In other implementations, the system uses the three-dimensional spatial model to generate a transformation between coordinates of the model and coordinates within the field of view of cameras placed within the property. The system then uses the transformation to correlate non-visible activity data collected by sensors placed within the property (e.g., motion sensor data) and visible activity data that is captured within a field of view of a camera. Other examples are described in greater detail below.

In addition, the system is capable of using monitoring and reporting techniques to minimize security risks associated with a delivery operation to be performed at property. For example, the system uses and applies delivery rules to determine if and when detected activity data associated with the operator presents a security risk to the property (e.g., detecting that the operator has performed an unauthorized action that is not specified by any delivery rules). The system may transmit alert notifications to a central monitoring station and/or an electronic device associated with the occupant of the property.

In some implementations, the system is capable of being configured to perform different system actions responsive to different detected security levels. For instance, the system can enter a heightened security level configuration that increases the sensitivity of monitoring operations performed during and after a monitoring operation. As an example, during a delivery operation, the system may elevate a weight and/or severity associated with a detected intrusion relative to a weight and/or severity associated with a detected intrusion during another time period.

Figure 1B:
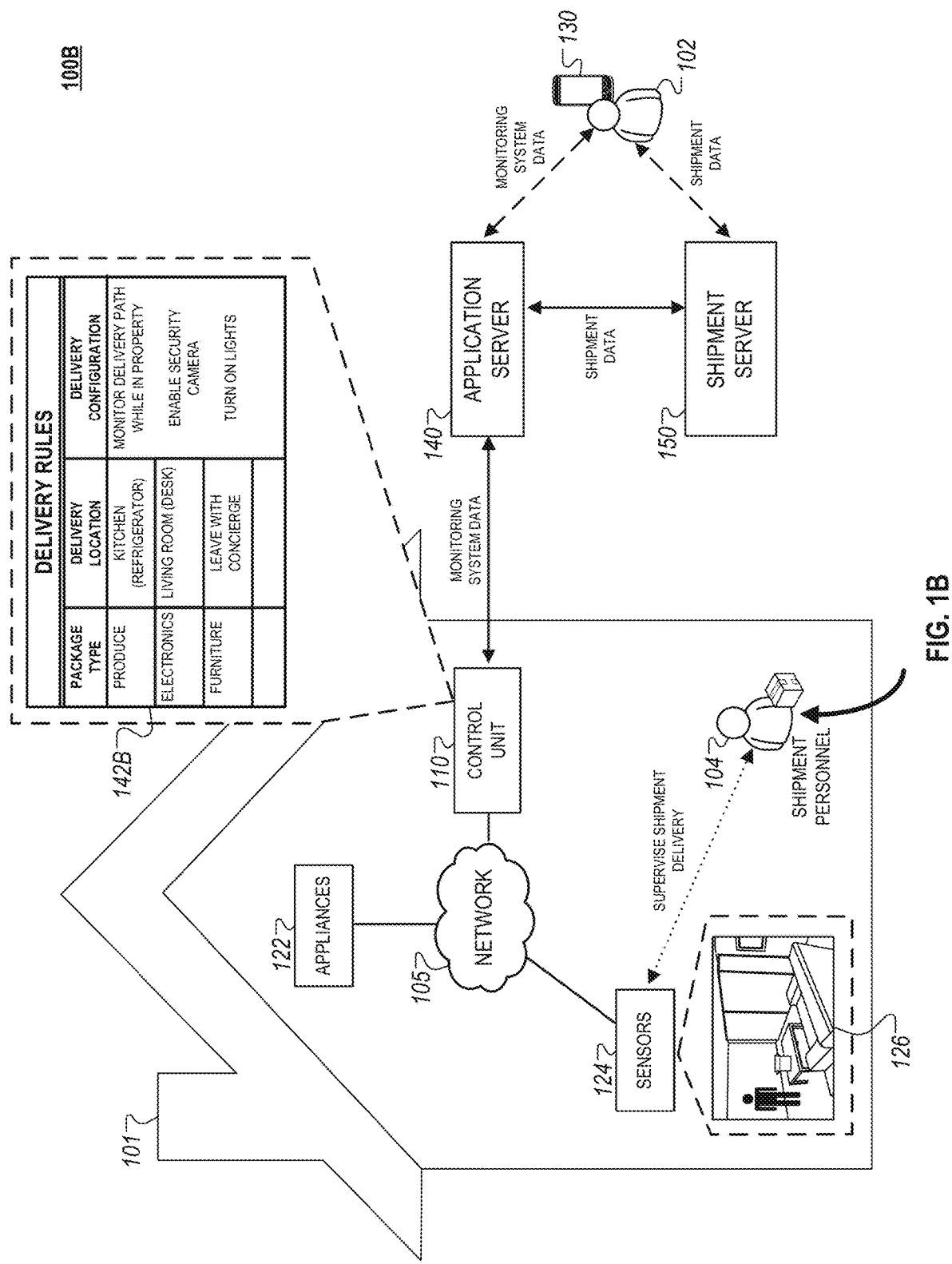

FIGS. 1A and 1B illustrate examples of systems 100A and 100B that are capable of using techniques to supervise delivery personnel within an indoor environment of a property. Referring initially to FIG. 1A, the system 100A uses remotely stored delivery rules to supervise delivery personnel. The system 100A includes a control unit 110, appliances 122, sensors 124, a user device 130, an application server 140, and a shipment server 150.

In general, the system 100A can be used to supervise a delivery operation that is performed by an operator 104. The operator 104 can be associated with a package delivery company that manages and/or operates the shipment server 150. Once the operator 104 enters the property 101, the sensors 124 collect activity data associated with the delivery operation (e.g., detected movement through an indoor environment of the property 101). The data collected by the sensors 124 can transmitted to the control unit 110, which may process and/or store the data as monitoring system data.

The control unit 110 exchanges the monitoring system data with the application server 140, which also exchanges shipment data associated with the delivery operation (e.g., tracking number of the delivery operation, employee information of the operator 104, information for the package to be delivered) with the shipment server 150. The monitoring system data and the shipment data can also be transmitted to the user device 130. The user device 130 can be associated with an occupant 102 that is the recipient of the delivery at the property 101.

In the example illustrated in FIG. 1A, the system 100A initially authenticates the identity of the operator 104 when he/she arrives at the property 101. For instance, the property 101 may include a front door sensor where the operator 104 scans an employee badge and/or an identifier associated with the package to be delivered (e.g., a Quick Response (QR) code). The scanned information is compared with information included within the shipment data obtained from the shipment server 150 in order to authenticate the operator 104. In other examples, the front door sensor may include a video camera for verifying the identity of the operator 104 and/or the package to be delivered. In such examples, the data collected by the video camera may be stored for use as evidence if a dispute between the occupant 102 and a shipment delivery company associated with the operator 104 arises at a later time.

Once authenticated, the system 100A permits the operator 104 to enter into the property 101 (e.g., by transmitting an instruction to unlock an electronic lock of the front door). The system 100A then configures the sensors 124 to collect activity data associated with the operator 104 while he/she remains within the property 101. For example, an indoor security camera may capture video footage 126 where the operator 104 is within its field of view. The system 100A periodically transmits activity data collected by the sensors 124 to the control unit 110 and/or the application server 140.

During the delivery operation (e.g., a time period during which the operator 104 remains within the property premises), the system 100A processes the data collected by the sensors 124 in relation to delivery configuration data 142a stored on the application server 140. For example, the system 100A identifies a destination point within the property 101 based on the type of the package to be delivered by the operator 104. The system 100A guides the operator 104 to identified destination point using various techniques described in greater detail below (e.g., selectively turning on lights in a region of the property that includes the destination point, providing a user interface on an associated device with instructions, etc.).

The system 100A also monitors the activity of the operator 104 during the delivery operation. For example, the system 100A processes the data collected by the sensors 124 determines whether the indicated activity satisfies delivery rules specified by the delivery configuration data 142a. For example, as described in greater detail below, a delivery rule may define a permission region of the property 101 where the operator 104 may move throughout. In this example, if the operator 104 enters a region that is not specified by the delivery rule, the system 100A may determine that the activity data fails to satisfy the delivery rule.

The system 100A may perform various reporting and security operations in response to a determining violation of a delivery rule. For instance, in some implementations, each delivery rule may be associated with a specified severity level that designates the action to be taken by the system 100A in response to a determined violation. For example, if an operator 104 has accidentally exited the permissible region defined by one delivery rule, then the system 100A may generate an instruction to play a verbal alert to guide the operator 104 back to the permissible region. In another example, if the operator 104 has attempted to touch or steal a valuable object that is under surveillance, then the system 100A may instead generate an alarm condition at the property 101 and transmit an alert notification reporting the attempt to the application server 140 and/or the user device 130.

After the operator has delivered the package to the identified destination point, the system 100A guides the user back to an entrance of the property 101 using similar techniques as described above. The system 100A monitors the conditions of the property 101 to determine when and if the operator 104 has left the premises. For example, the system 100A may track activity data collected by motion sensors within an indoor environment of the property 101 and determine that the operator 104 has left the property 101 if there has been no detected motion activity for a certain period of time after the entrance door has been detected to open and close. In other examples, the system 100A may collect visual footage of the front door and determine that the operator 104 has left the premises once he/she is no longer detected within a field of view of a security camera that monitors the front door of the property 101. In some other examples, the property 101 can be configured to allow the operator 104 can scan an associated device or badge upon entering and exiting the property (e.g., using a wireless keychain fob and an associated sensor). In these examples, the system 100A can use the detected scanning events to identify time periods when the occupant 104 is within the property 101.

Referring now to the components of system 100A, the network 105 is configured to enable exchange of electronic communications between devices connected to the network 105. For example, the network 105 may be configured to enable exchange of electronic communications between the control unit 110, the appliances 122, the sensors 124, the user device 130, the application server 140, and the shipment server 150.

The components of the system 100A can be connected over a network 105. The network 105 can be a local network (e.g., a local area network within a property 101), a wide area network (e.g., the Internet), or a combination of multiple networks (e.g., a local area network and a wide area network). For example, the control unit 110, the appliances 122, and the sensors 124 may be connected over a local area network through a network access point within the property 101 (e.g., a router). In contrast, the control device 110, the user device 130, the application server 140, and the shipment server 150 may be connected over a wide area network such as the Internet. In this example, the local area network and the wide area network may be included within the network 105.

In addition, the network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway.

The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The control unit 110 may include a controller and a network module. The controller can be configured to control a monitoring system (e.g., a home alarm or security system). In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.).

The network module may be a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module also may be a wired communication module configured to exchange communications over the network 105 using a wired connection. For instance, the network module may be a modem, a network interface card, or another type of network interface device. The network module may be an Ethernet network card configured to enable the control unit 110 to communicate over a local area network and/or the Internet. The network module may also be a voice band modem configured to enable the alarm panel to communicate over the telephone lines of Plain Old Telephone Systems (POTS).

The control unit 110 may store sensor and image data received from the system 100A and perform analysis of sensor and image data received from the system 100A. Based on the analysis, the control unit 110 may communicate with, and control aspects of, the appliances 122, the sensors 124, or the user device 130. In addition, the control unit 110 may store dynamic object data (e.g., based on sensor data collected by the sensors 124), or information associated with object data (e.g., historical status information associated with objects). The control unit 110 may also store data associated with the three-dimensional spatial model for the indoor environment of the property 101. For example, the control unit 110 may store historical data associated with previously generated three-dimensional spatial models of the property 101 over a specified period of time.

The system 100A may also include various appliances 122 in the property 101. The appliances 122 may be home automation devices connected to the network 105 that are configured to exchange electronic communications with other devices of the system 100A. The appliances 122 may include, for example, connected kitchen appliances, controllable light sources, safety and security devices, energy management devices, and/or other types of electronic devices capable of exchanging electronic communications over the network 105. In some instances, the appliances 122 may periodically transmit information and/or generated data to the control unit 110 such that the control unit 110 can automatically control the operation of the appliances 122 based on the exchanged communications. For example, the control unit 110 may operate one or more of the appliances 122 based on a fixed schedule specified by the user. In another example, the control unit 110 may enable or disable one or more of the appliances 122 based on received sensor data from the sensors 124.

The system 100A also includes one or more sensors or detectors. For example, the system 100A may include multiple sensors 124. The sensors 124 may include a contact sensor, a motion sensor, a glass break sensor, or any other type of sensor included in an alarm system or security system. The sensors 124 also may include an environmental sensor, such as a temperature sensor, a water sensor, a rain sensor, a wind sensor, a light sensor, a smoke detector, a carbon monoxide detector, an air quality sensor, etc.

The sensors 124 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 124 may include a radio-frequency identification (RFID) sensor that identifies a particular article that includes a pre-assigned RFID tag.

In some implementations, the sensors 124 may include one or more cameras. The cameras may be video/photographic cameras or other type of optical sensing devices configured to capture images. For instance, the cameras may be configured to capture images of an area within a building monitored by the control unit 110. The cameras may be configured to capture single, static images of the area and also video images of the area in which multiple images of the area are captured at a relatively high frequency (e.g., thirty images per second). The cameras may be controlled based on commands received from the control unit 110. In some examples, the cameras can employ various types of depth-sensing three-dimensional scanners (e.g., RGB-D cameras) that may be used to capture three-dimensional spatial information associated with the indoor environment of the property 101.

The user device 130 may be any type of electronic computing device. For example, the user device 130 can be one or more of a smartphone, a laptop computing device, a tablet computing device, a desktop computing device, a smart wearable device, or any other type of electronic device that is capable of network-enabled communications with the other components of the system 100A (e.g., the control unit 110, application server 140, the shipment server 150) over the network 105. The user device 130 can be associated with the occupant 102 such that the occupant 102 can use the user device 130 to perform various actions while he/she is remote from the property 101. For example, the occupant 102 can use the user device 130 to check the present status of a monitoring system of the property 101, check the delivery status of a packaged to be delivered at the property 101 by the operator 104, view monitoring system data collected by the sensors 124, among others.

The user device 130 may include a native application that enables communications with devices located within the property 101 through the application server 140. The native application refers to software/firmware programs running on the user device 130 that enable various features. For instance, the user device 130 may load or install the native application based on data received over a network 105 or data received from local media. The native application may run on various mobile device platforms associated with the user device 130.

In some implementations, the native application of the user device 130 identifies a geographic location associated with the user device 130 and communicates information identifying the geographic location. For example, the user device 130 having the native application may determine a geographic location of the user device 130 using GPS capabilities, and may communicate data identifying the geographic location to the application server 140. In some instances, the native application may check the location of the user device 130 periodically and may detect when a user is presently located inside or outside a property. In other instances, the presence of the user device 130 within the property 101 can be identified using various other types of techniques. For example, the system may use one or more of video detection, wireless protocol sensing, or sensor event detection to determine that the user device 130 is located within the property 101 (e.g., when GPS signal may be unreliable for location detection). In other examples, the location of the user device 130 can be inferred based on identifying the last known location of the user device 130 within the three-dimensional spatial model of the property 101.

Additionally, or alternatively, the user device 130 may communicate with the control unit 110, the sensors 124, and/or the appliances 122 using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards.

The application server 140 may be an electronic device configured to provide monitoring services for the property 101. The application server 140 may exchange electronic communications with the control unit 110, the appliances 122, the sensors 124, the user device 130, and the shipment server 150 over the network 105. For example, the application server 140 may obtain and store data associated with a monitoring system of the property 101 from the control unit 110. The application server 140 may also obtain shipment data from the shipment server 150. As described in detail below, the application server 140 may use the monitoring system data and the shipment data to generate a repository that stores the delivery configuration data 142a.

The delivery configuration data 142a includes various types of information that can be used by the system 100A to perform monitoring operations related to a delivery operation performed inside the property 101. In the example depicted, the delivery configuration data 142a specifies a destination point for different types of packages, and a set of delivery rules that are applied by the system 100A to monitor and/or track detected activity of the operator 104 when he/she is inside the property 101. In this example, the system 100A determine an appropriate destination point for the operator 104 to deliver the package based on a package type indicated within the shipment data from the shipment server 150. In addition, the delivery rules specify triggers and/or conditions that enable the system 100A to determine if the operator 104 has performed an unauthorized action (e.g., leaving a specified delivery route). The delivery rules also enable the system 100A to perform specified actions in relation to the delivery operation (e.g., enabling a security camera and turning on lights once the operator 104 has entered into the property 101).

In some implementations, the application server 140 is operated and/or maintained by, for example, a service provider company that provisions and/or manages monitoring services for multiple properties including the property 101. For example, the application server 140 may be associated with security provider that provides alarm security services to the property 101.

The application server 140 may be configured to monitor events (e.g., alarm events, emergency conditions, etc.) generated by the control unit 110, the sensors 124, and/or the appliances 122. For example, the application server 140 may exchange electronic communications with the network module included in the control unit 110 to receive information regarding events (e.g., fire, carbon monoxide) detected by the control unit 110. The application server 140 also may receive information regarding events (e.g., alarm events) from the control unit 110.

The application server 140 may also store sensor and image data received from the system 100A and perform analysis of sensor and image data received from the system 100. Based on the analysis, the application server 140 may communicate with and control aspects of the control unit 110, the sensors 124, the appliances 122, or the user device 130. In addition, the application server 140 may store dynamic object data (e.g., based on sensor data collected by the sensors 124), or information associated with dynamic object data (e.g., historical status information associated with dynamic objects). The application server 140 may also store data associated with the dynamic multi-dimensional spatial representations that are determined for the property 101. For example, the application server 140 may store historical data associated with previously generated spatial representations of the property 101 over a specified period of time.

The shipment server 150 may be an electronic device configured to provide shipping and delivery information for a package to be delivered by the operator 104 at the property 101. For example, the shipment server 150 can transmit a tracking number associated with a package shipment, package content information, and/or a delivery status indicating a predicted date and time of the delivery operation. The shipment server 150 may also store information associated with the operator 104 (e.g., employee identification information, delivery truck information, historical deliveries performed by the operator, etc.). The shipment server 150 may also track auditable events that are associated with the delivery operation. For example, the shipment server 150 may track events associated with property entrance by the operator 104, data indicating whether the operator 104 has dropped a package (or has improperly handled the package), or acted inappropriately while inside the property 101. In such examples, the auditable data can be used to hold the operator 104 accountable for insufficient and/or inappropriate performance while conducting the delivery operation.

The shipment server 150 may be managed and/or operated by a package delivery company that is associated with the operator 104. For example, the package delivery company can offer a delivery service that is used by a merchant to ship a package to the property 101. In some implementations, the package delivery company is distinct from the service provider that manages and/or operates the application server 140 and provides monitoring services at the property 101. In such implementations, the application server 140 may be associated with multiple shipment servers that are each associated with a different package delivery system. In this regard, the system 100A can be used to track and monitor delivery operations that are performed by different package delivery companies.

The shipment server 150 and the application server 140 periodically exchange shipment data and monitoring system data that are associated with the property 101. For instance, the shipment server 150 transmits shipment data to the application server 140, which enables the system 100A to identify a package to be delivered by the operator 104. In addition, the application server 140 transmits monitoring system data (e.g., the delivery configuration data 142a) to the shipment server 150, which enables the operator 104 to view and receive property-specific information related to performing a delivery operation within the property 101. For example, once the operator 104 has entered into the property 101, the shipment server 150 may transmit the delivery configuration data 142 to an associated device to enable the operator 104 to understand the conditions and/or restrictions under which he/she is to perform the delivery operation. As described in detail below, in some implementations, the delivery configuration data 142a can be used to guide the operator 104 through the property 101 to a destination point associated with the delivery operation.

In some implementations, the system 100A can be configured to improve and/or optimize the delivery process at the property 101. The system 100A may be configured to adjust the operation of in-home devices (e.g., the appliances, 122, sensors 124) during a delivery operation. For example, the system 100A may enable cameras, lights, and/or other monitoring devices automatically in response to detecting that the operator 104 has entered the property 101. In addition, the system 100A may enable a doorbell camera to collect custom information from the operator 104 prior to providing access to the property 101 (e.g., package information, delivery information, etc.).

In addition, the system 100A may enable the doorbell to, for example, collect video footage of the operator 104 to validate his/her identity, collect video footage of the package to validate package integrity. In some instances, the system 100A may provide a substitute means to complete the signature confirmation process for a package delivery. For example, in response to receiving data indicating that the operator 104 has arrived at the property 101, the system 100A transmits a signature request to the user device 130 that enables the occupant 102 to provide a real-time electronic signature that is then sent to the shipment server 150 for confirmation. Referring now to FIG. 1B, the system 100B refers to an alternative configuration of the system 100A where delivery configuration data is locally stored on, for example, the control unit 110. As depicted, the control unit 110 uses delivery configuration data 142b to locally monitor, track, and configure monitoring operations relating to the delivery operation with limited or no dependence on the application server 140. In this example, the system 100B is capable of monitoring the detected activity of the operator 104 during emergency conditions where there is limited or no network connectivity between the control unit 110, the application server 140, and the shipment server 150. In addition, the control unit 110, appliances 122, and/or the sensors 124 can perform the processing operations that are typically performed by the application server 140 in the system 100A (e.g., generating a three-dimensional spatial model for the property 101, determining if a delivery rule has been violated, and/or detecting the start or end of a delivery operation).

In some implementations, the system 100B operates based on the control unit 110 and the application server 140 periodically exchanging shipment data and monitoring system data at specified time points. In such implementations, the application server 140 transmits the shipment data from the shipment server 150 and the configuration data that configures local monitoring operations to the control unit 110. The control unit 110 then locally stores the received shipment data and the configuration data in order to perform the monitoring techniques relating to a delivery operation without requiring connectivity to the application server 140.

The systems 100A and 100B, as described above, can be configured in different implementations that perform various operations. For example, in some implementations, the system can include an integrated aberration engine that is configured to detect unexpected activity within or nearby the property 101 in relation to a delivery operation. The aberration engine may collect various types of activity data during a time point when the delivery operation is being performed at the property 101. In such implementations, the system may use the supervised delivery techniques to augment the operations of the aberration engine to distinguish between aberrant activity and activity that is associated with a delivery operation that would otherwise be considered aberrant activity. For example, if the system detects a door that is opened in the middle of day (which would normally be considered aberrant) that is associated with a delivery operation, the aberration engine may determine that the detected activity is normal and not aberrant. In this example, the data associated with a delivery operation can be used to reduce false positive detection of aberrant activity. In other examples, the aberration engine may ignore certain types of collected data during or after a delivery operation that would otherwise cause the aberration engine to trigger an alert condition and/or increase monitoring of the property. For instance, video data indicating that an unauthorized user (e.g., an individual that is not predetermined to be associated with the property 101) can be ignored by the aberration engine during a delivery operation because the operator 104 has not been previously associated with the property 101 but has permission to enter the property 101. Alternatively, in some other examples, the aberration engine may determine that certain types of detected activity are aberrant while a delivery operation is being performed, but are otherwise non-aberrant when a delivery operation is not being performed. For instance, detected user activity in a certain region of the property during a regular time period (e.g., a time period when a delivery operation is not being performed) may be considered non-aberrant, but detected user activity in the same region of the property during a delivery operation may be considered aberrant because the delivery rules specify that the region is a restricted region during the delivery operation.

In some implementations, the system can include one or more sub-systems that enable specific capabilities or functions. For example, the system can include an authentication or validation engine that is used to prevent unauthorized deliveries. In this example, the system may include an electronic lock that has a scanning device that verifies a code (e.g., a QR code) on the package, which is then compared to a verified code obtained from the shipment server 150. In another example, the system can include a security camera that monitors the exterior of the property to detect the presence of a delivery truck to verify that the operator 104 is in fact an authorized employee of the package delivery company associated with the shipment server 150. In yet another example, the system can include a guidance subsystem that automatically turn lights on and off in regions of the property that includes a destination point of the delivery operation. For instance, the system can include a voice guidance system through a personal assistant device located within the property 101. The voice guidance system can provide information (e.g., navigation instructions) to guide the operator 104 through the indoor environment of the property 101.

In some implementations, the data collected by the system can be used to provide first responders with the ability to understand the indoor environment of the property 101 without having to enter the property premises. For example, as described in detail below with respect to FIGS. 2A-2B, the system may generate a two-dimensional representation of the property 101 that includes detected objects within the indoor environment of the property 101. The two-dimensional representation may be provided as a navigational map such that the first-responders can understand the floorplan of the property and identify potential obstructions and pathways through the property during an emergency condition. For example, the two-dimensional representation may indicate the locations of activated sensors (e.g., heat sensors, smoke sensors, fire sensors, motion sensors), which can then be used by first responders to identify a location of a victim within the property, a location of a fire, among other types of emergency conditions.

In some implementations, the system can be configured to be aware of property conditions and perform actions responsive to the property conditions. For example, the system can adjust its monitoring and supervising operations for a delivery operation based on the presence of household pets inside the property 101. In this example, if the property 101 includes a household pet, then the system may provide a notification to the operator 104 before he/she enters the property 101 so that he/she can be made aware of the presence of the household pet. In addition, the system may be capable of performing actions to deter the household pets from disturbing the operator 104 as he/she is performing a delivery operation. For example, the system can play an audible sound and/or provide a visual cue that attracts the attention of the household pet while the operator 104 performs the delivery operation. In other examples, the system can control access to pet doors to reduce the likelihood of potential interactions between a household pet and the operator 104. For instance, the system may open a pet door and/or enable a partition before the estimated start time of a delivery operation so that the household pet does not affect the performance of the delivery operation.

In some implementations, the system includes one or more autonomous devices such as an unmanned aerial vehicle (UAVs) (e.g., a drone device) or a ground-based robotic device. In such implementations, the autonomous devices can be used to supplement, augment, and/or replace various operations of the system that are described throughout. For example, in some implementations, the autonomous device can be configured to optically scan the indoor environment of the property 101 without any user input. In this example, the data scanned by the on-board sensors of the autonomous device (or the sensors 124) and be used to generate a three-dimensional spatial model of the indoor environment of the property 101. In another example, the autonomous device can be used as a security device that monitors the condition of the property and/or the detected activity of the operator 104. In this example, the autonomous device may navigate through the property to determine if the operator 104 has performed a suspicious action and/or an action that is not permitted by one of the delivery rules.

In some implementations, the autonomous device can be used as a guidance device that guides the operator 104 through the indoor environment of the property 101 along a specified delivery route. For example, the autonomous device can greet the operator 104 when he/she enters the property 101, and then automatically navigates to a specified destination point where the package is to be delivered. In such implementations, the autonomous device may provide real-time guidance to the operator 104. For example, the autonomous device may provide audible or visual cues relating to the detected movement and/or activity of the operator. Alternatively, the audible and visual cues may also be presented to the operator 104 through a mobile application that runs on an associated device.

The systems 100A and 100B can also be configured to enable various residential and commercial applications. With respect to residential applications, the system can be configured to enable access control for home deliveries, enable delivery monitoring on the user device 130, enable delivery guidance for the operator 104, among others. As some examples, the system can monitor activity patterns within the property 101 based on historical activity data collected by the sensors 124. In one particular example, the system can be used to enable elderly monitoring based on identifying expected time periods when an elderly occupant is expected to appear on a particular monitoring camera or multiple monitoring cameras. The system can also store various types of property information that is gathered through the monitoring of a delivery operation. For example, the system can collect a three-dimensional spatial model of the property 101, an alert notification history, a two-dimensional representation of the property 101, or various access control features associated with occupants and/or authorized individuals (e.g., first responders, law enforcement individuals, etc.).

With respect to commercial application, the system can be configured to provide additional capabilities that are not used in residential properties. For example, the system can be configured to monitor different delivery operations for multiple organizations that occupy a commercial space, monitor manufacturing, logistics, and/or shipping information associated with the delivery operations, maintenance, custodial, security, among others.

In some implementations, the operator 104 is associated with one or more sensing device that capture data while the operator 104 performs the delivery operation at the property 101. For example, the operator 104 can wear a networked body camera that collects video footage of the field of view of the operator 104 while he/she is inside the property 101. In this example, the collected video footage can be transmitted and stored at the shipment server 150 in a delivery transaction record associated with the delivery operation. In another example, the position of the operator within the property may be inferred by registering the field of view of the camera to the 3D model of the property, as is described for the installed cameras. In another example, the operator may use an associated smart phone (or any other type of data collecting device) to manually collect for example, photos and/or videos relating to conducting the delivery operation (e.g., a photo of a package after it has been delivered to a designated location within the property 101). In each of these examples, the data captured by the sensing devices can be used to collect evidence to establish, for example, that the delivery operation was performed in adherence with the delivery rules, that the package was actually delivered by the operator 104, and/or establish that the operator 104 properly performed the delivery operation.

In some implementations, the systems 100A and 100B, as described throughout, can be used for improve other types of services aside from package delivery services. For example, the systems 100A and 100B can be used to enable a pick-up service (e.g., a dry cleaning service, a laundry service, a cleaning service, etc.). In such examples, the systems 100A and 100B may use similar monitoring techniques described throughout to ensure that activity data associated with the operator 104 complies with a set of rules that have been configured based on user input provided by a property occupant.

The systems 100A and 100B, as discussed above, can be configured in various implementations to provide different capabilities, features, and/or functionalities discussed in more detail below. For example, in some implementations, the systems 100A and 100B can be configured to improve the ease of verifying the identity of the delivery operator 104 prior to providing access to the property 101. In such implementations, the identity of the delivery operator 104 can be performed without requiring the delivery operator 104 to, for instance provide an access code to unlock a front door of the property 101 or manipulate an electronic lock of the property 101 to obtain access to the property 101. For example, in some instances, the systems 100A and 100B can be configured to use different identity verification techniques for delivery personnel that frequently deliver packages to a property and delivery personnel that attempt to access a property for the first time. In this example, the systems 100A and 100B may employ a rigorous identity verification technique each time an individual delivers a package to the property 101 for the first time. This might involve a registration procedure where a picture of the individual is collected along with employee and contact information. After the registration procedure is completed, the information can be stored in an access list that the systems 100A and 100B use to provide access to individuals for package deliveries. In this example, once the individual has been added to the access list, a less time-consuming identity verification technique may be employed by the systems 100A and 100B for each subsequent time the individual attempts to access the property 101 to deliver a package. For instance, the systems 100A and 100B can use facial identification to provide access to the property 101 without requiring the individual to submit a one-time code and/or provide any other information since he/she has been added to the access list for the property 101. In some instances, the property 101 can process the shipment data to determine that the individual assigned to the package delivery is an individual included in the access list, and in response, reduce the requirement to verify the identity of the individual to provide access to the property 101.

In some implementations, the application server 140 can be configured to operate as a security server that supervises actions that take place in the property 101 during a delivery operation. For example, the application server 140 can obtain sensor data collected by the sensors 124 in real-time to generate a visualization of the property 101 that represents detected movement and/or activity by the delivery operator 104 during a delivery operation. In such implementations, the application server 140 may have access to a three-dimensional or two-dimensional spatial representation of the property 101 that is dynamically updated based on data collected in real-time by the sensors 124 to represent movement of the delivery operator 104 within the property 101 during a delivery operation. In some instances, where the systems 100A and 100B identify a specified delivery route within the property 101 and/or a specified location to deliver the package within the property 101, the application server 140 can generate visualizations that represent real-time movement of the delivery operator 104 in relation to the specified delivery route and/or the specified delivery location. For example, the visualizations can identify set of activities that are expected to occur (e.g., front door opening, entry motion into the property 101, motion through hallways of the property 101, etc.) and the application server 140 can monitor the activity to confirm that expected activities are performed and monitor for the occurrence of unexpected activities (e.g., deviation from the delivery route into a restricted region of the property 101).

In some implementations, the systems 100A and 100B can be configured to provide both automated or manual supervision of delivery operations that the property 101. In such implementations, the systems 100A and 100B can use different types of criteria to determine when to provide automated or manual supervision. For example, the systems 100A and 100B may use automated supervision for deliveries of packages with low monetary values (e.g., less than $100) and use manual supervision (e.g., supervision by a customer service representative associated with the application server 140) for deliveries of packages with high monetary values (e.g., greater than $100). As another example, the systems 100A and 100B may use automated supervision for deliveries where there is no specified delivery location and the package can be delivered to any location within the property (e.g., behind the front door of the property 101) and use manual supervision for deliveries where a package is to be delivered to a specific location within the property 101 (e.g., inside the refrigerator of the kitchen). In yet another example, the systems 100A and 100B can use automated supervision for deliveries that may take longer periods of time to complete (e.g., furniture deliveries) and have manual supervision for deliveries that take shorter periods of time to reduce monitoring costs.

In some instances, the systems 100A and 100B can be configured to dynamically shift between automated and manual delivery supervision based on monitoring sensor data collected by the sensors 124 during a delivery operation. For example, if the sensor data collected during an automated supervision of a delivery operation indicates that the delivery operator 104 is acting suspiciously, then the delivery operation can be escalated to manual supervision so that a customer service representative can evaluate the conduct of the delivery operator 104 in the property 101. As another example, if the sensor data indicates that the delivery operator 104 has deviated from a specified delivery route during manual supervision, then the delivery operation can be escalated to manual supervision to determine whether the deviation was a mistake made by the delivery operator 104 or a deliberate attempt to enter a restricted region of the property 101. When a delivery operation is escalated to manual supervision, the customer service representative may be provided with access to video footage collected by security cameras located in the property 101, sensor data collected by the sensors 124, or other types of associated information. In some instances, the customer service representative may be prompted to prepare reports on the delivery operation once an escalation event has occurred so that data that triggers escalations can be monitored over time during delivery operations in multiple properties to identify actions that delivery operators that are often represent navigational mistakes and other actions that reflect suspicious behavior.

In some implementations, the systems 100A and 100B can be configured to use and/or provide different types of delivery supervision techniques in relation to the present occupancy of the property 101 during a delivery operation. For example, the systems 100A and 100B can use an automated delivery supervision technique (e.g., less monitoring) if the property 101 is determined to be occupied by a user when a package is to be delivered at the property 101. In another example, the systems 100A and 100B can use a manual delivery supervision technique (e.g., monitoring performed by a customer service representative) if the property 101 is determined to be vacant when a package is to be delivered at the property 101.

In instances where the systems 100A and 100B applies automated delivery supervision techniques, the systems 100A and 100B can perform various types of supervision techniques without requiring substantial user activity and/or input. For example, as discussed in greater detail below, the systems 100A and 100B can be configured to use various types of information verification techniques to verify the identity of the delivery operator 104 without requiring a customer service representative to confirm that the delivery operator 104 is permitted to access the property 101. As another example, the systems 100A and 100B can use spatial representations of the property 101, user designations of restricted areas and/or restricted objects, expected delivery locations in the property 101 to automatically identify suitable delivery routes that the delivery operator 104 may use when navigating through the property 101. In this example, the systems 100A and 100B can use package information (e.g., contents, type of package, etc.) to automatically determine a delivery location within the property 101, determine a delivery route from the front door of the property 101 to the delivery location. Once the delivery route is determined, the delivery operator 104 can be provided with a set of navigational instructions that include, for instance, an identification of the determined delivery route, restricted regions of the property 101, and key reference points along the delivery route. For instance, the shipping information for a package to be delivered to the property 101 indicates that the package includes produce that needs to be refrigerated. In such instances, the systems 100A and 100B can determine that the delivery location of the package is inside a refrigerator in the kitchen. Using a predetermined spatial representation of the property 101, the systems 100A and 100B can then identify a location of the refrigerator within the property 101, which is then used to determine a delivery route from the front door of the property 101 and the refrigerator. Navigational instructions for the delivery route can then be provided to a computing device of the delivery operator 104 so that the delivery operator 104 can rely on the navigational instructions to complete the delivery operation.

In some implementations, the systems 100A and 100B can be configured to monitor video and/or image data collected by sensors worn by and/or placed on the delivery personnel 104 during a delivery operation at the property 101. In such implementations, the sensors worn by and/or placed on the delivery operator 104 can include, for instance, a body camera worn by the delivery operator 104 as he/she performs the delivery operation. Video and/or image data collected by the body camera can represent a point-of-view (POV) of the delivery operator 104 to enable real-time monitoring of movement of the delivery operator 104 within the property 101 during a delivery operation. In some instances, the body camera can be configured to exchange data communications with the application server 140, the shipment server 150, or both. In such instances, video and/or image data collected by the body camera can be used to monitor movement of the delivery operator 104 inside the property 101 in real-time to determine whether the delivery operator 104 has performed a restricted action and/or has entered into a restricted region of the property 101. For example, the video and/or image data collected by the body camera can be used to determine if the delivery operator 104 has deviated from a specified delivery route to a delivery destination within the property 101. As another example, the video and/or image data collected by the body camera can be used to confirm whether the delivery operator 104 has placed the package to be delivered at the correct location within the property 101.

In some implementations, the systems 100A and 100B can be configured to automatically use techniques to automatically unlock a front door of the property prior to the start of a delivery operation. In such implementations, the property 101 can have a camera placed on the exterior of the property 101 that is configured to monitor for the presence of a known object that is associated with a delivery operation. For example, the camera can use object recognition techniques to determine the presence of a delivery vehicle and/or a delivery operator nearby the property 101. The camera can be provided with shipment data from the shipment server 150 that indicates a predicted time period for the delivery operation (e.g., a two-hour time window for a package delivery on a specified date). In this example, the camera can identify a region within its field of view that corresponds to, for instance, a license plate of a delivery vehicle or a face of the delivery operator 104. Image data collected by the camera can be analyzed to determine whether the delivery operator is actually the individual that is identified in the shipment data as the individual that is assigned to deliver the package to the property 101. For example, facial recognition techniques can be applied to determine if the collected image data includes the delivery operator assigned to the delivery operation. As another example, a license plate number for a vehicle detected in the image data can be verified to determine if it matches a verified license plate number for the delivery vehicle assigned to deliver the package to the property 101.

In some implementations, the systems 100A and 100B can be configured to adjust a security state of the property 101 in relation to a delivery operation at the property 101. For example, the control unit 110 can initially determine that a delivery operation is expected to occur at the property 101 (e.g., based on receiving a request to access a property during a delivery time window specified by shipment data). If the present security status of the property 101 is "ARMED," the control unit 110 can automatically adjust the security status of the property 101 to "ARMED—STAY" based on the determination that a delivery operation is expected to occur at the property 101. In this example, the adjustment of the security status of the property 101 prevents the security system of the property 101 from triggering an alarm condition once the delivery operator 104 is provided with access to the property 101. The control unit 110 then determines that the delivery operation has concluded (e.g., based on detecting that the delivery operator 104 has exited the property 101 or that the package has been successfully delivered to the property 101). In response, the control unit 110 can then adjust the security status of the property 101 from "ARMED—STAY" to "ARMED" to prevent any further intrusions in the property 101 after the delivery operation. In this regard, the automatic adjustment of the security status of the property 101 in relation to a delivery operation can be used to prevent false alarm conditions at the property 101 and/or prevent the delivery operator 104 from having to provide a security code to disarm the security system of the property 101 upon being provided with access to the property 101.

Figure 2A:
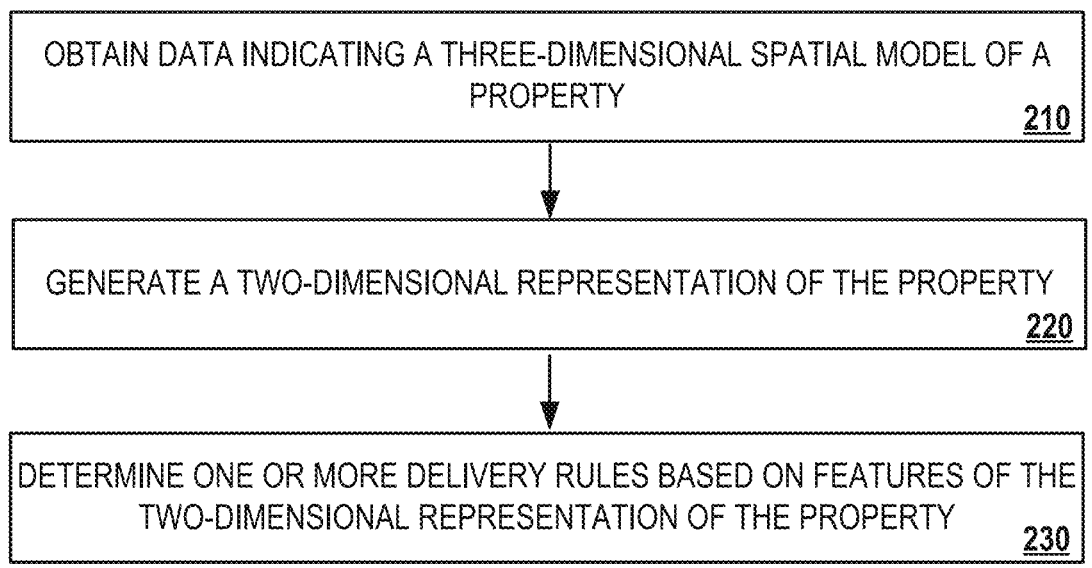
FIG. 2A illustrates an example of a process for generating delivery rules that are used to supervise a delivery to a property.

FIG. 2A illustrates an example of a process 200A for generating delivery rules that are used to supervise a delivery to a property. Briefly, the process 200A can include obtaining data indicating a three-dimensional spatial representation of a property (210), generating a two-dimensional spatial representation of the property (220), and determining one or more delivery rules based on features of the two-dimensional spatial representation of the property (230).

In general, the process 200A may be performed by one or more components of the systems described above (e.g., the control unit 110, the application server 140). For example, in some implementations, one or more of the operations described below are performed remotely by the application server 140 based on data collected locally within the property 101. As described above with respect to FIG. 1A, in such implementations, the data collected by the sensors 124, the control unit 110 can be transmitted over the network 105 to the application server 140, when then processes and aggregates the collected data in order to perform the operations described below. Alternatively, in other implementations, the control unit 110 (or other devices that are present within the property 101) locally performs the operations described below. As described above with respect to FIG. 1B, in such implementations, the data collected by the operations can be performed with limited or no reliance on the application server 140. However, the operations are described below as being performed by the application server 140 for simplicity.

In more detail, the process 200A can include obtaining data indicating a three-dimensional spatial representation of a property (210). For instance, the application server 140 may obtain data that includes a three-dimensional spatial model that characterizes depth information for an indoor environment of the property 101. As described in detail below with respect to FIG. 2B, the three-dimensional spatial model can be generated based on, for example, optical scanning data that is collected by a scanning device. In other examples, the three-dimensional spatial model can be generated based on any suitable spatial tracking modality. The scanning device collects depth information that enables the application server 140 to recognize, for example, objects that are present within the property 101, the boundaries of the property 101, and other structural features of the indoor environment (e.g., walls, fixtures, windows, doors, etc.).

The process 200A can include generating a two-dimensional spatial representation of the property (220). For instance, the application server 140 can select a portion of the three-dimensional spatial model to represent in a two-dimensional representation of the property 101. As described in detail below with respect to FIG. 2B, the two-dimensional representation can be, for example, a top view of the three-dimensional spatial model for the property 101. The two-dimensional representation can be generated to illustrate the placement, arrangement, and location of objects, boundaries, fixtures, doors, and/or windows that are detected within the three-dimensional spatial model.

The process 200A can include determining one or more delivery rules based on features of the two-dimensional spatial representation of the property (230). For instance, the application server 140 may process the data included within the two-dimensional representation to generate one or more delivery rules for a delivery operation. In some instances, a delivery rule may specify a trigger and an associated system action to be performed by the system in response to a satisfaction of the trigger. For example, a delivery rule may specify generating an audible signal if activity of the operator 104 has been detected outside a delivery region of the property 101. As described in greater detail below, the delivery rules can be generated based on manual input from a user (e.g., based on user input on the two-dimensional represent that is provided for output), or generated automatically based on processing features or characteristics of the property 101.

Figure 2B:
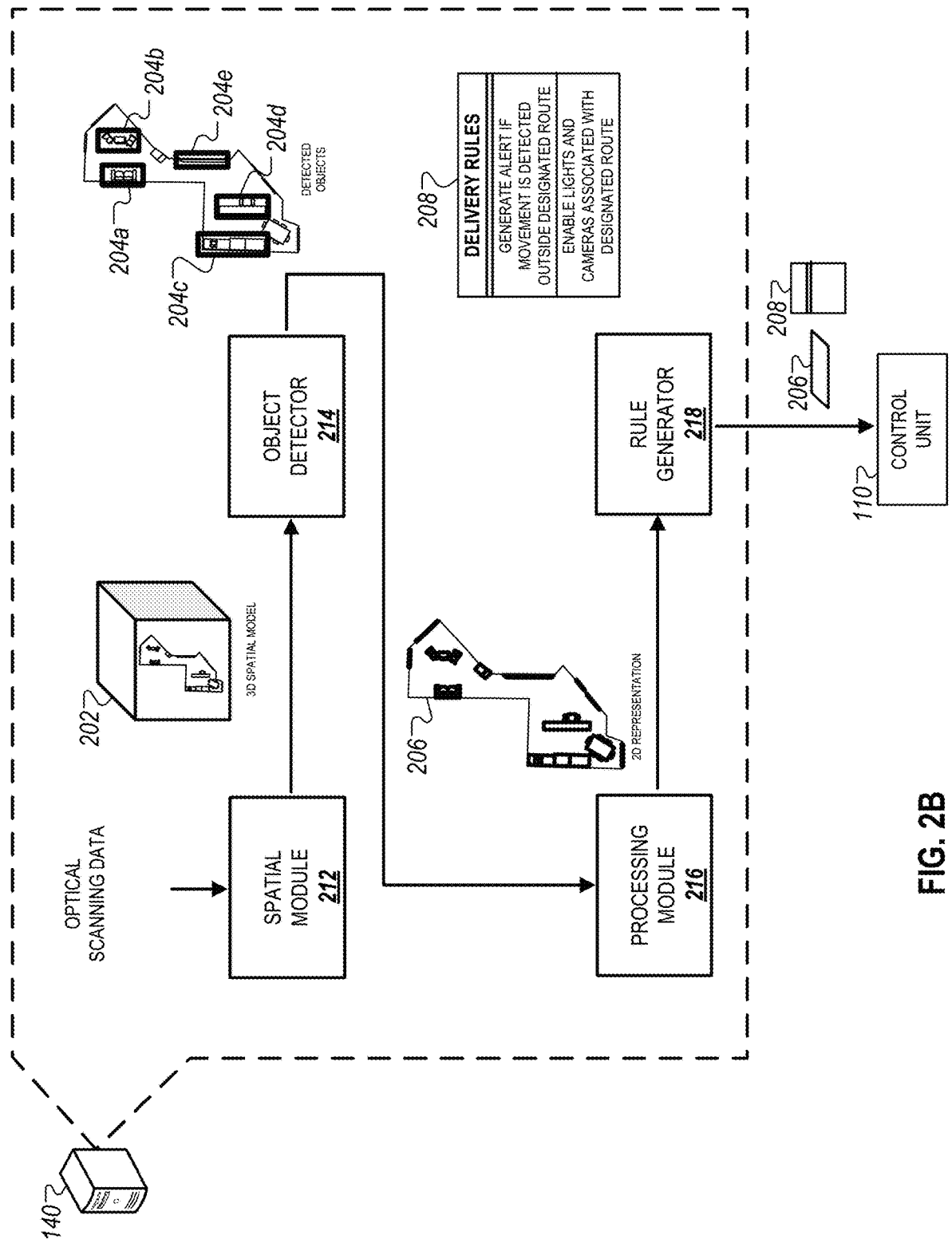
FIG. 2B illustrates an example of a technique for generating a spatial representation of a property.

FIG. 2B illustrates an example of techniques for generating a spatial representation of a property (e.g., the property 101). Although in this example, the application server 140 performs the illustrated techniques, the techniques may additionally or alternatively be performed locally by the control unit 110 and without any dependencies to the application server 140. In such implementations, the control unit 110 may obtain configuration data from the application server 140 such that, during emergency conditions where there is limited or no network connectivity within the property 101, the control unit 110 is capable of performing the illustrated techniques independently of the application server 140.

In general, the illustrated techniques can be used by a system (e.g., the system 100A and/or the system 100B) to identify various types of spatial information of an indoor environment of the property 101. As described in detail below, the spatial information can be used to detect objects that are present within the indoor environment. The location, arrangement, and/or configuration of the objects within the indoor environment can then be used to identify delivery routes and/or delivery rules that are then applied to monitor or supervise a delivery operation. In some implementations, the techniques are performed to generate a two-dimensional representation of the indoor environment, which can be provided for output to the operator 104 (e.g., for navigational assistance), or to the occupant 102 (e.g., for configuring delivery rules, configuring delivery options/preferences, display and control purposes, etc.). For example, the two-dimensional representation can be used to indicate a detected location of the operator 104 within the property 101, a location within the property where the operator 104 delivered the package, or status information associated with the control unit of the system.

In the example, the application server 140 generally includes a spatial module 212, an object detector 214, a processing module 216, and a rule generator 218, which each performs a set of operations. For instance, the spatial module 212 generates a three-dimension spatial model 202 based on monitoring system data. The object detector 214 processes the three-dimensional spatial model 202 to identify objects 204a-e within the indoor environment of the property 101. The processing module 216 extracts portions of the three-dimensional spatial model 202 corresponding to the identified objects 204a-e and generates a two-dimensional representation 206 of the property 101. The rule generator 218 determines delivery rules 208 that are mapped to one or more of the identified objects 204a-e within the two-dimensional spatial representation. The two-dimensional representation 206 and the delivery rules 208 can then be stored remotely on the application server 140 (e.g., as depicted in FIG. 1A), or stored locally on the monitor control unit 110 (e.g., as depicted in FIG. 1).

In more detail, the spatial module 212 initially obtains monitoring system data collected by, for example, the appliances 122 and/or the sensors 124 and optical scanning data collected by a scanning device. The spatial module 212 generates the three-dimensional spatial model 202 based on processing and/or aggregating the obtained data.

In the example depicted in FIG. 2B, the spatial module 212 is executed on the application server 140. In this example, the optical scanning data is collected locally by a scanning device within the property 101 and then transmitted to the application server 140 for post-processing and model generation. The scanning device can be any type of electronic device that is capable of using optical scanning techniques to collect three-dimensional depth information. For example, the scanning device can include a built-in time of flight sensor and a visual inertial odometry (VIO) sensor that uses, for example, inside-out motion tracking and optical scanning techniques, to identify boundaries within the indoor environment of the property 101. In addition, the scanning device can scan the indoor environment manually (e.g., movement of a camera by a user moving through the property 101), or autonomously (e.g., a drone device scanning the indoor environment of a property 101 without any user input).

In some implementations, the spatial module 212 generates the three-dimensional spatial model 202 based on data collected by a depth sensor (e.g., an RGB-D camera) that is capable of augmenting a two-dimensional image with depth information (e.g., related with the distance to the sensor) on a pixel-by-pixel basis. In such implementations, the depth sensor may use simultaneous localization and mapping (SLAM) techniques to estimate depth trajectories to generate the three-dimensional spatial model 202 of the indoor environment of the property 101. The output of spatial module, in these implementations, can be a three-dimensional point cloud of the indoor environment of the property 101. In other implementations, other suitable three-dimensional optical scanning techniques may be used to generate three-dimensional models of different formats. For example, the three-dimensional spatial model 202 can be additionally or alternatively be a textured mesh model, a high-resolution voxel grid, a surface model, among others.

The object detector 214 processes the three-dimensional spatial model 202 to identify objects of interest that are detected within the model (e.g., the detected objects 204a-e). The object detector 214 may use various heuristics to identify the objects. For example, the object detector 214 may inspect the boundaries in the three-dimensional spatial model 202 to identify reference points and/or surfaces (e.g., the floor, the ceiling, etc.). The object detector 214 may also use height heuristics to determine that objects that are determined to have voxels that extend to the entire height of the indoor environment are likely to represent walls or permanent partitions. Similarly, in another example, the object detector 214 may determine that objects that have voxels that extend to a partial height of the indoor environment (e.g., halfway from the floor to the ceiling) are likely to represent furniture or other types of movable objects.

The object detector 214 may also use various types of object detection and/or recognition techniques to identify the presence of objects within the three-dimensional spatial model 202. For example, the object detector 214 may use shape recognition and/or dimensional analysis to determine objects that are pieces of furniture (e.g., couch, chairs, table, etc.) and objects that represent permanent fixtures (e.g., walls, windows, doors, etc.). The object detector 214 may also use color and texture information collected by the scanning device to improve object recognition and/or detection.

In some implementations, the object detector 214 may include one or more neural networks (e.g., convolutional neural networks, deep neural networks, etc.), or other types of machine learning models, that employ multiple layers of operations to predict one or more outputs from one or more inputs. In such implementations, the one or more neural networks can be trained to recognize and/or detect the presence of a particular object (e.g., a couch) or a category of objects (e.g., furniture) within the three-dimensional spatial model 202. For example, the object detector 214 may compute feature vectors for a candidate object within the three-dimensional spatial model 202 and provide the feature vectors as input to the one or more neural networks. The one or more neural networks can then provide a confidence score representing a likelihood that the candidate object represents the particular object or category of objects for output to the object detector 214.

In the example depicted in FIG. 2B, the object detector 214 detects objects 204*a-e* within the three-dimensional spatial model 202. In this example, the object 204*a* represents a couch, the object 204*b* represents a set of chairs nearby a table, object 204*c* represents a kitchen countertop, object 204*d* represents a dining table, and object 204*e* represents a painting that is placed on the wall. The object detector 214 is therefore capable of detecting and/or recognizing different types of objects (e.g., furniture, fixtures, etc.) as well as objects of different sizes, shapes, and/or textures. The objection detection and/or classification techniques used by the object detector 214 can be used to predict whether a detected furniture is likely to be stationary (e.g., a bookcase fixture) or movable (e.g., a dining room chair).

The processing module 216 processes the spatial information included in the three-dimensional spatial model 202 and the detected objects 204*a-e* to generate the two-dimensional representation 206. In the example depicted, the processing module 202 extracts selects a top view of the indoor environment from the three-dimensional spatial model 202, extracts the data associated with the detected objects 204*a-e*, and generates a two-dimensional representation that depicts a top-view of the indoor environment of the property 101. In this example, the view of the indoor environment depicted in the two-dimensional representation 206 can be used to identify a navigable path from a property entrance (e.g., the front door) to one or destination points where a package is to be delivered.

The processing module 216 can also process the two-dimensional representation 206 to remove various types of noise that may be present (e.g., noise from the scanning data that is included within the three-dimensional spatial model 202, noise associated with object detection). For example, the processing module 216 may compare a confidence level for a particular object computed by the object detector 214 to a predetermined threshold, and determine that the particular object has been falsely detected if the computed confidence level fails to satisfy the threshold.

The processing module 216 may perform various verification operations to ensure the accuracy of the two-dimensional representation 206. For example, processing module 216 may verify that the two-dimensional spatial representation 206 is visually accurate in terms of where detected objects are placed within the property 101. In this example, the processing module 216 may compare the generated the two-dimensional representation 206 to pictures of the property 101 that indicate locations of the objects. In another example, the processing module 202 may verify that the size, orientation, and geometry of the objects that are included in the two-dimensional representation 206.

In some implementations, the processing module 216 may adjust the appearance of the two-dimensional representation 206 after generation. The processing module 216 may adjust colors of structures or attributes of the property 101. For example, the processing module 216 may classify each of the detected objects 204*a-e*, and then designate a certain color for each object based on its object classification (e.g., designating furniture as red and walls as yellow). In another example, the processing module 216 may add patterns and/or textures to render structures of the property 101 (e.g., adding a wood texture to the floor to represent wooden floors).

In some implementations, the processed two-dimensional representation 206 can be, for example, provided for output to a user device (e.g., a user device of the operator 104, or on the user device 130 of the occupant 102). For example, the two-dimensional representation 206 can be used as an interactive map that assists and/or guides the operator 104 once he/she enters the property 101. In another example, the two-dimensional representation 206 can be used to provide the occupant 102 with information associated with the delivery that has recently been performed at the property 101 (e.g., indicating a delivery path taken by the operator 104).

The rule generator 218 determines one or more delivery rules 208 based on features or attributes associated with the two-dimensional representation 206 of the indoor environment of the property 101. As described above, a delivery rule defines a scope of permissible actions that the operator 104 may take when conducting a supervised delivery operation. In this regard, a detected violation of a particular delivery rule causes the system to determine that the operator 104 has performed an action that is not authorized by the occupant 102.

The delivery rules 208 can be generated automatically, or based on input provided by the occupant 102 (or any other authorized user associated with the property 101). For example, in some implementations, the rule generator 218 automatically identifies possible delivery routes within the property (e.g., based on determining objects and/or regions within the two-dimensional spatial model that are predicted to be destination points). The rule generator 218 then maps the delivery routes onto the two-dimensional representation 206 to determine delivery rules that are associated with each navigational route. Alternatively, in another example, the system may provide the two-dimensional representation 206 for output to the occupant 102 and request that he/she specify, for instance, preferred delivery routes from the property entrance to destination points, restricted regions of the property 101, and/or other types of user preferences during an ongoing delivery (e.g., time of delivery, monitoring operations to perform, lights to turn on/off, etc.).

In the example depicted, the delivery rules 208 include a rule that instructs the system to generate an alert notification of the operator 104 is detected to have left a designated region of the property associated with a delivery route. For instance, the system determines that this rule has been violated if the operator 104 wanders into a region of the property that is not included in a designated delivery route. The delivery rules 208 also includes a rule that enables the lights and cameras associated with the delivery route once the operator 104 is determined to have entered the property 101. For instance, once the system has authenticated the operator 104 and enabled access to the property 101, the system transmits instructions to a monitoring system within the property 101 to turn on lights that are nearby the delivery route (e.g. turning on kitchen lights and hallway lights to the kitchen if the destination point is the refrigerator). Once configured, the two-dimensional representation 206 and the delivery rules 208 can be stored locally at the control unit 110 and/or the application server 140.

Although FIG. 2B illustrates software modules running on the application server 140, in various implementations, one or more of the software modules may additionally, or alternatively, run on other components of the system (e.g., the control unit 110, the sensors 124, etc.). For example, the spatial module 212 can also be executed locally on the control unit 110, the scanning device, or a combination of both. In this example, the scanning device may generate the three-dimensional spatial model 202 locally and then transmit the generated spatial model to the control unit 110 and/or the application server 140.

In some implementations, the geometry of the delivery rules 208 can be represented and translated between the three-dimensional spatial model 202, the two-dimensional representation 206, and/or in the two-dimensional image space of each camera that is located within the property 101, depending on the specific use case of the systems 100A and 100B (e.g., based on property type, based on the package type, based on the type of delivery operation, etc.). Similarly, the tracked location of the operator 104 and other detected objects 204*a-e*, and the evaluation of the delivery rules 208 can be represented and executed in any or all of the three-dimensional spatial model 202 or the two-dimensional representation 206. For example, an indoor camera of the property 101 may track a detection location of the operator 104 within an associated two-dimensional representation (e.g., a two-dimensional floorplan that indicates a real-time location based on a detected individual within the camera's field of view). In this example, another device may project the detected location of the operator 104 within the two-dimensional representation to a three-dimensional spatial model. This device may then apply a set of delivery rules to determine if any of the delivery rules have been violated based on the projection of the detection location of the operator 104 within the three-dimensional spatial model. In this regard, the system may apply the delivery rules 208 based on tracking the detected location of operator 104 within one or both of the two-dimensional spatial representation 206 or the three-dimensional spatial model 202.

Figure 3A:
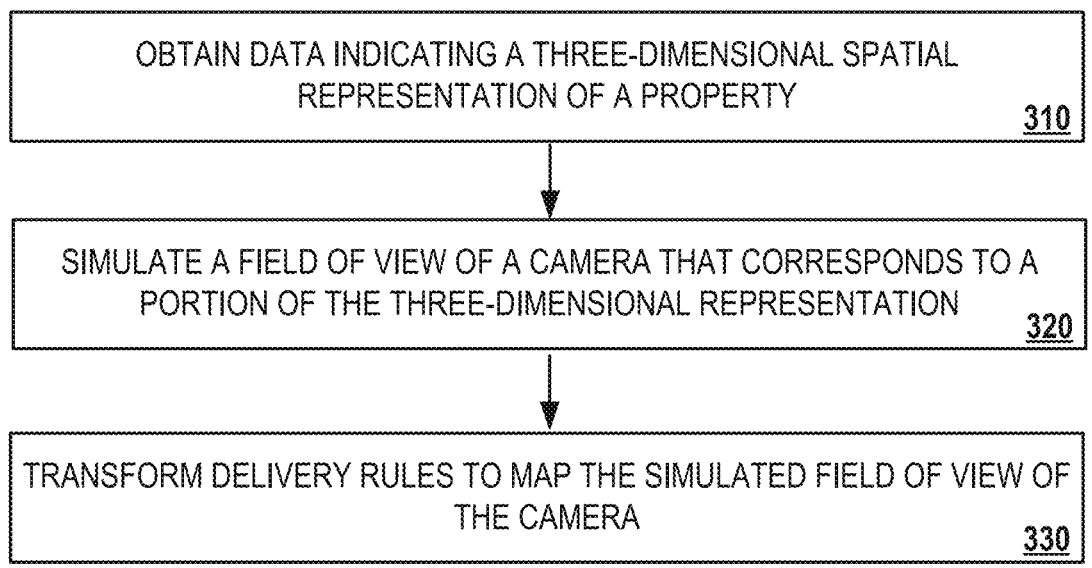
FIG. 3A illustrates an example of a process for simulating a field of view of a camera based on a spatial representation of a property.

FIG. 3A illustrates an example of a process 300A for simulating a field of view of a camera based on a spatial representation of a property. Briefly, the process 300A can include obtaining data indicating a three-dimensional spatial representation of a property (310), simulating a field of view of a camera that corresponds to a portion of the three-dimensional representation (320), and transforming delivery rules to map the simulated field of view of the camera (330).

In general, the process 300A may be performed by one or more components of the systems described above in FIGS. 1A and 1B (e.g., the control unit 110, the application server 140). For example, in some implementations, one or more of the operations described below are performed remotely by the application server 140 based on data collected locally within the property 101. As described above with respect to FIG. 1A, in such implementations, the data collected by the sensors 124, the control unit 110 can be transmitted over the network 105 to the application server 140, when then processes and aggregates the collected data in order to perform the operations described below. Alternatively, in other implementations, the operations described below are provided locally by the control unit 110 (or other devices that are present within the property 101). As described above with respect to FIG. 1B, in such implementations, the data collected by the operations can be performed with limited or no reliance on the application server 140.

In more detail, the process 300A can include obtaining data indicating a three-dimensional spatial representation of a property (310). For instance, the application server 140 may obtain data that includes a three-dimensional spatial model (e.g., the three-dimensional spatial model 202) that characterizes depth information for an indoor environment of the property 101. As described in detail below with respect to FIG. 2B, the three-dimensional spatial model can be generated based on optical scanning data that is collected by a scanning device. The scanning device collects depth information that enables the application server 140 to recognize, for example, objects that are present within the property 101, the boundaries of the property 101, and other structural features of the indoor environment (e.g., walls, fixtures, windows, doors, etc.).

The process 300A can include simulating a field of view of a camera that corresponds to a portion of the three-dimensional representation (320). For instance, the application server 140 may generate one or more simulated camera views of the indoor environment of the property 101 based on the three-dimensional spatial model obtained in step 310. As described in greater detail below with respect to FIG. 3B, the application server 140 may select placement settings for a virtual camera such as a coordinate location where the virtual camera is placed, a viewing direction of the virtual camera, and a viewing angle for the virtual camera. The simulated camera view can represent a predicted field of view of a camera when it is placed and configured according to the placement settings for the virtual camera.

In some implementations, the application server 140 may generate multiple simulated camera views in order to identify an optimal multi-camera placement within the property 101. The optimal multi-camera placement can represent a placement of multiple cameras that captures the greatest portion of the delivery route. A user can then use the optimal multi-camera placement to reduce the number of blind spots of the delivery route that are not viewable by the cameras within the property 101.

The process 300A can include transforming delivery rules to map the simulated field of view of the camera (330). For instance, the application server 140 may transform delivery rules (e.g., the delivery rules 208 as described above with respect to FIG. 2B) to a coordinate system associated with the three-dimensional spatial model 202. As described in detail below with respect to FIG. 3A, this transformation enables the system to correlate a point within the simulated camera view to a corresponding location within the three-dimensional spatial model for the property 101. The system can then use the transformation to monitor activity detected within the camera view in order to determine if a delivery rule has been violated. For example, the system can determine whether a delivery rule that specifies a delivery route within the property 101 has been violated based on monitoring a portion of the camera view that displays a portion of the property 101 that includes the delivery route.

Figure 3B:
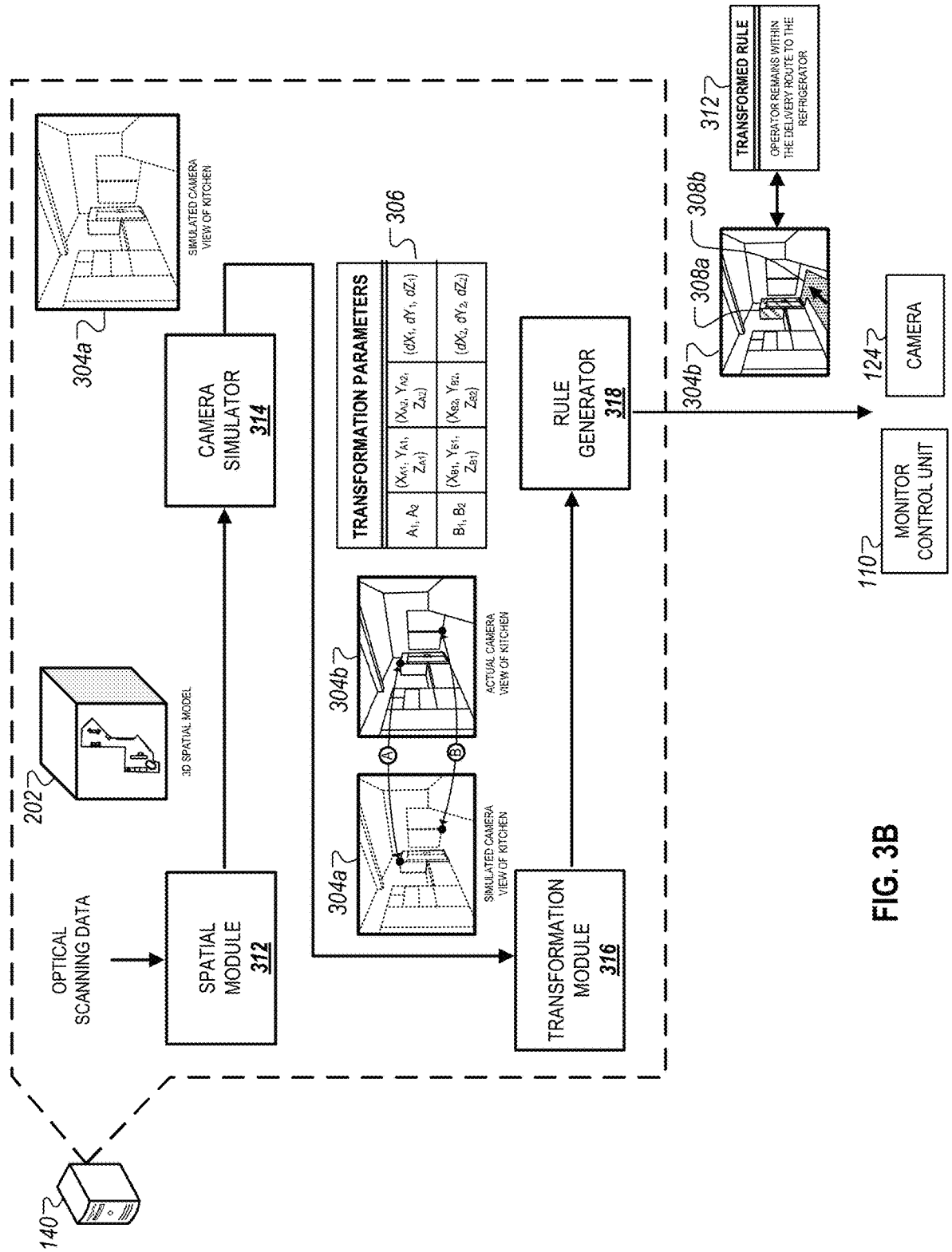
FIG. 3B illustrates an example of a technique for simulating a field of view of a camera based on a spatial representation of a property.

FIG. 3B illustrates an example of techniques for simulating a field of view of a camera based on a spatial representation of a property. Although in this example, the application server 140 performs the illustrated techniques, in other implementations, the techniques may additionally, or alternatively, be performed locally by the control unit 110 and without any dependencies to the application server 140. In such implementations, the control unit 110 may obtain configuration data from the application 140 such that, during emergency conditions where there is limited or no network connectivity within the property 101, the control unit 110 is capable of performing the illustrated techniques independently of the application server 140.

In general, the illustrated techniques can be used by a system (e.g., the system 100A and/or the system 100B) to correlate video data collected by a security camera and a three-dimensional spatial model of the indoor environment of the property 101. This correlation enables the system to monitor, supervise or track the movement and/or activity of the operator 104 while he/she is inside the property 101 performing a delivery operation. As described in greater detail below, the techniques can also be used, for example, to identify an optimal camera placement within the property, apply delivery rules to detect rule violations based on detected sensor data, calibrate a security camera's video feed to a coordinate system associated with the three-dimensional spatial model of the property 101, and/or validate the completeness or accuracy of the initial three-dimensional spatial scan.

The techniques illustrated in FIG. 3B can be performed sequentially and/or in parallel with the techniques illustrated in FIG. 2B in relation to a supervised delivery operation. For example, in some implementations, the system initially performs the techniques illustrated in FIG. 2B to generate a spatial model for the indoor environment of the property 101, and then performs the techniques illustrated in FIG. 3B to correlate a field of view of cameras with the generated spatial model. In this example, the system performs the techniques illustrated in FIGS. 2B and 3B prior to supervising a delivery operation at the property 101. In another example, the system generates a spatial model for the indoor environment of the property 101 (e.g., the three-dimensional spatial model 202), and then uses a single spatial model to perform the object detection and rule generation operations, as described above with respect to FIG. 2B, and the camera simulation and coordinate transformation operations, which are described in greater detail below.

In the example, the application server 140 generally includes a spatial module 312, a camera simulator 314, a transformation module 316, and a rule generator 318, which each performs a set of operations. For instance, the spatial model 312 generates the three-dimensional spatial model 202 using operations similar to those described above with respect to the spatial model 312. The camera simulator 314 generates one or more simulated camera views 304a that each represent a predicted field of view of a camera when placed at a particular location. The transformation module 316 maps the simulated camera views 304a to actual views 304b to compute transformation parameter 306. The rule generator 318 maps a set of delivery rules (e.g., the delivery rules 208) to the simulated camera views 304a using the transformation parameters 306 to identify a destination point 308a and an overlay 308b corresponding to a delivery route.

In more detail, the spatial module 312 obtains monitoring system data and optical scanning data and generates the three-dimensional spatial model 202 in a manner similar to that described previously with respect to the spatial module 312.

The camera simulator 314 processes the spatial information included within the three-dimensional spatial model 202 to generate one or more simulated camera views (e.g., the simulated camera view 304). In the depicted example, the simulated camera view 304 represents a virtual field of view of a camera that is placed in a kitchen of the property 101. The camera simulator 314 generates the simulated field of view 304a based on estimating a perspective view using the depth information included in the three-dimensional spatial model 202. For example, the camera simulator 314 may generate the simulated field of view based on selecting a coordinate location (e.g., an x-coordinate, a y-coordinate, and a z-coordinate) within the spatial model to place a virtual camera, a field of view of the virtual camera, and a viewing direction of the virtual camera. The simulated field of view 304a includes a rendering of a portion of the three-dimensional spatial model 202 that is predicted to correspond to a field of view of a real camera that is actually configured in a similar manner within the property 101.

In some implementations, the system uses the simulated camera views 304a to identify an optimal camera arrangement for a particular delivery route within the property 101. In such implementations, the system may initially determine a delivery route between a property entrance and a destination point using the techniques described above. The system then generates multiple simulated camera views corresponding to different camera configurations (e.g., camera placement, camera angle, and camera direction) where the delivery route is viewable to the virtual camera. The system then selects an optimal camera placement based on determining the simulated camera view where a greatest portion of the delivery route is viewable to the virtual camera.

In some implementations, multiple simulated camera views can be used to identify an optimal multi-camera arrangement within the property 101. For instance, if the entirety of a delivery route is not viewable by a single camera, then the system may determine a combination of multi-camera configurations that minimize the number of blind spots of the delivery route. In such implementations, the system can select a multi-camera arrangement that enables effective cross-camera tracking that combines video feeds from multiple cameras that are placed in different region of the property to monitor the operator 104 as he/she passes from one camera view to another camera view.

For example, in response to detecting a disappearance of operator 104 in a first video feed, the system then begins to monitor for the appearance of the operator 104 in a second video feed that is determined to monitor a nearby region of the property 101 using the three-dimensional spatial model 202. In this example, the system measures a time delay between the disappearance in the first video feed and the appearance in the second video feed. If the time delay is below specified threshold time period, and if the detected movement is geometrically consistent with the surrounding region indicated within the three-dimensional spatial model 202, then the system determines that the occupant 104 has moved in a certain direction between the two video feeds.

The transformation module 316 compares the simulated camera view 304a, which can be generated based on the three-dimensional spatial model 202 and an actual camera view 304b in order to calibrate an associated camera to the three-dimensional spatial model 302. To accomplish this, the transformation module 316 can select a reference point within the simulated camera view 304a and identifies a matching reference point within the actual camera view 304a. The pair of points can be matched based on, for example, comparing features of nearby regions of the camera views and determining a correspondence of features between the two regions. Once two points are determined to correspond to one another, the transformation module 316 identifies their respective locations within each coordinate system (e.g., in a coordinate system of the three-dimensional spatial module 202, and a coordinate system of the actual camera view 304b). The transformation module 316 compares the determined locations to identify transformation parameters 306 that represent a translation between the respective coordinate systems. In some instances, where the transformation module 316 is unable to identify matching points within the simulated camera view 304a and the actual camera view 304b, the transformation module 316 may use various types of statistical analyses to identify the best matched points (e.g., closely matched points) within the simulated camera view 304a and the actual camera view 304b.

In some implementations, the transformation between the simulated camera view 304a and the actual camera view 304b can be treated as a re-localization process, as in a Simultaneous Location and Mapping (SLAM) routine, where the system determines whether a new image comes from a previous location or a new location. For example, a set of landmarks can be extracted from the simulated camera view 304a during a mapping phase (e.g., during the data capturing phase for the three-dimensional spatial model 202), and then used for correspondence matching against the actual camera view 304b by the transformation module 316. In this example, the system may capture enough spatial data during the mapping phase to ensure accurate registration between the simulated camera view 304a and the actual camera view 304b.

In the example depicted, the transformation module 316 identifies two pairs of reference points, which are denoted as "A" and "B." The transformation module 316 uses spatial information obtained by a depth sensor and compares the coordinate location of reference point "$A_1$" in the simulated camera view 304a (e.g., $X_{A1}$, $Y_{A1}$, $Z_{A1}$) and the coordinate location of reference point "$A_2$" in the actual camera view 304b (e.g., $X_{A2}$, $Y_{A2}$, $Z_{A2}$). In this example, the transformation parameters (e.g., $dX_1$, $dY_1$, $dZ_1$) represent a translation between the coordinate locations of reference point "$A_1$" and "$A_2$." The transformation parameters, in this example, can therefore be used by the system to identify corresponding locations within the three-dimensional spatial model 202 and the camera viewpoint 304b. In other examples, the transformation parameters 306 can include other types of parameters. In other examples, the transformation parameters can be associated with other types of Euclidian transformations (e.g., an affine transformation).

In some implementations, the transformation module 316 can re-calibrate and/or adjust a previously generated transformation between the three-dimensional spatial model 202 and the camera view 304b to account for camera movements or adjustments. In such implementations, the transformation module 316 may compute a feature correspondence between the camera view 304b and the three-dimensional spatial model 202 to perform various types of video analytics.

In some implementations, the system utilizes the transformation between the three-dimensional spatial model 202 and the camera view 304b to identify blind spots in the camera view 304b and address any occlusions (e.g., due to the presence of furniture or other objects). In such implementations, the system identifies an individual (e.g., the occupant 104) within the camera view 304b. The system then uses the transformation to identify corresponding coordinate of the individual's position within the three-dimensional spatial model 202. The system then uses the corresponding coordinates to make certain types of inferences related to activity monitoring and tracking. For example, the system may infer that the detected individual is standing on a portion of the floor even if the floor is not shown in the camera view 304b. The system then determines if the floor location is included within the delivery route to determine whether the individual is standing within a permissible region.

The rule generator 318 maps a set of delivery rules (e.g., the delivery rules 208 as described above with respect to FIG. 2B) to a coordinate system of the camera view 304b using, for example, the transformation parameters 306. For example, a baseline delivery rule may include an instruction to generate an alert signal if the operator 104 has been detected to leave a region of the property included within a delivery route. The rule generator 306 can then use the transformation parameters 306 to identify a portion of the camera viewpoint 304b that corresponds to the region included within the delivery route. The rule generator 306 maps the identified portion of the camera view 304b to the baseline rule to generate a transformed rule. During a delivery operation, if a video feed indicates that the operator 104 has left the identified portion of the camera view 304b, then the system can determine that the transformed rule has been violated.

In the example depicted, the system determines that the camera view 304b includes a destination point 308a (e.g., a refrigerator in the kitchen) and an associated delivery route 308b (e.g., a pathway in the kitchen to the destination point 308a). The destination point 308a and the delivery route 308b are then associated with the transformed rules 312, which includes a rule that specifies that the operation should remain within the delivery route 308b during the delivery operation. If the video footage collected by a camera indicates that the operator 104 has stepped into a region outside of the delivery route 308b, then the system determines that the rule has been violated. In this regard, the association between a transformed rule, the coordinate system of the camera view 304b, the destination point 308a, and the delivery route 308b can be used by the system to track the movement of the operator 104 and ensure that the detected movement is in accordance with the transformed rule. In this example, the determination of the violation can take place within the camera view 304b (e.g., based on a detection of data within the camera's field of view that violates a transformed rule). Alternatively, the determination of the violation can also involve generating a three-dimensional footprint or trajectory of the operator 104 based on the collected video footage of the camera view 304b, the coordinate system of the camera view 304b, and the transformation between a delivery rule and the camera view 304b. In such instances, the deliver rule defined within the three-dimensional spatial model 202 can be directly enforced without being transformed to the two-dimensional image domain of the camera view 304b.

Figure 4A:
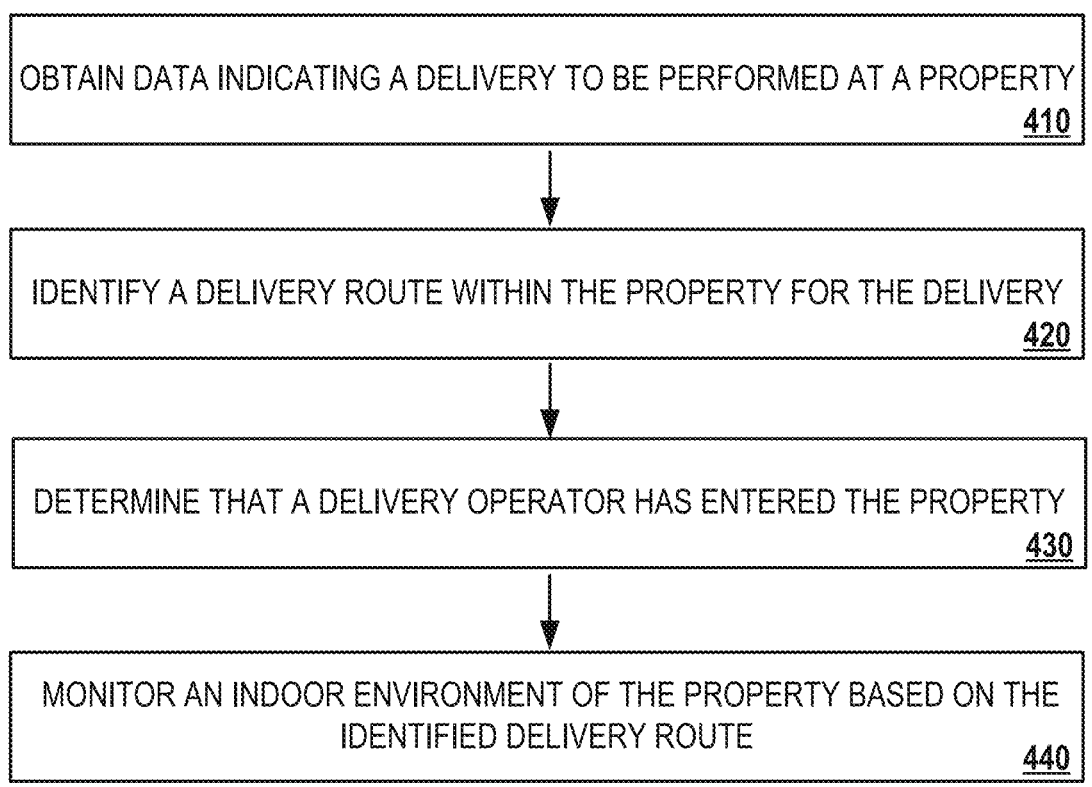
FIG. 4A illustrates an example of a process for supervising delivery personnel along a specified delivery route within an indoor environment of a property.

FIG. 4A illustrates an example of a process 400A for supervising delivery personnel along a specified delivery route within an indoor environment of a property. Briefly, the process 400A can include obtaining data indicating a delivery to be performed at a property (410), identifying a delivery route within the property for the delivery (420), determining that a delivery operator has entered the property (430), and monitoring an indoor environment of the property based on the identified delivery route (440).

In general, the process 400A may be performed by one or more components of the systems described above in FIGS. 1A and 1B (e.g., the control unit 110, the application server 140). For example, in some implementations, one or more of the operations described below are performed remotely by the application server 140 based on data collected locally within the property 101. As described above with respect to FIG. 1A, in such implementations, the data collected by the sensors 124, the control unit 110 can be transmitted over the network 105 to the application server 140, when then processes and aggregates the collected data in order to perform the operations described below. Alternatively, in other implementations, the control unit 110 (or other devices that are present within the property 101) locally performs operations described below. As described above with respect to FIG. 1B, in such implementations, the data collected by the operations can be performed with limited or no reliance on the application server 140.

In more detail, the process 400A can include obtaining data indicating a delivery to be performed at a property (410). For instance, the application server 140 may obtain shipment data from the shipment server 150 that indicates that a delivery operation is to be performed at the property 101. As described above, the shipment data can include other types of information such as shipment information associated with a package to be delivered (e.g., tracking number, a package type, etc.) and information associated with the operator 104 that is designated to perform the delivery operation. In some implementations, the shipment data can include a predicted time window (e.g., a two-hour time window) during which the delivery operation is expected to be performed at the property 101.

The process 400A can include identifying a delivery route within the property for the delivery (420). For instance, the application server 140 may determine a delivery route for the delivery operation that is to be performed by the property 101. As an example, the application server 140 may identify a starting point of the delivery route (e.g., a property entrance for the property 101) and a destination point for the delivery route (e.g., a location within the property 101 where a package is to be placed after it has been delivered). In some implementations, the application server 140 identifies the destination point based on the package type of the package to be delivered. For example, as illustrated in FIG. 1A, the application server 140 may select a refrigerator as the destination point for produce to be delivered to the property 101.

The process 400A can include determining that a delivery operator has entered the property (430). For instance, the application server 140 may determine that the operator 104 has entered the property 101 based on activity data indicating that an individual has entered into the property (e.g., data indicating that an electronic lock of the property 101 has been opened). In some implementations, the operator 104 is permitted to enter the property 101 once the identity of the operator 104 and/or the package has been verified. In such implementations, the application server 140 can verify the identity of the operator 104 and the package based on verified information obtained from the shipment server 150.

The process 400A can include monitoring an indoor environment of the property based on the identified delivery route (440). For instance, the application server 140 may transmit instructions various devices to enable monitoring operations within the property 101 relating to the identified delivery route. As an example, if a delivery route specifies a path from the front door of the property 101 to the kitchen, then the instructions can specify that lights in the kitchen be turned on and that security cameras that monitor the front entrance and the kitchen be enabled to capture video footage of the operator 104 inside the property 101.

Figure 4B:
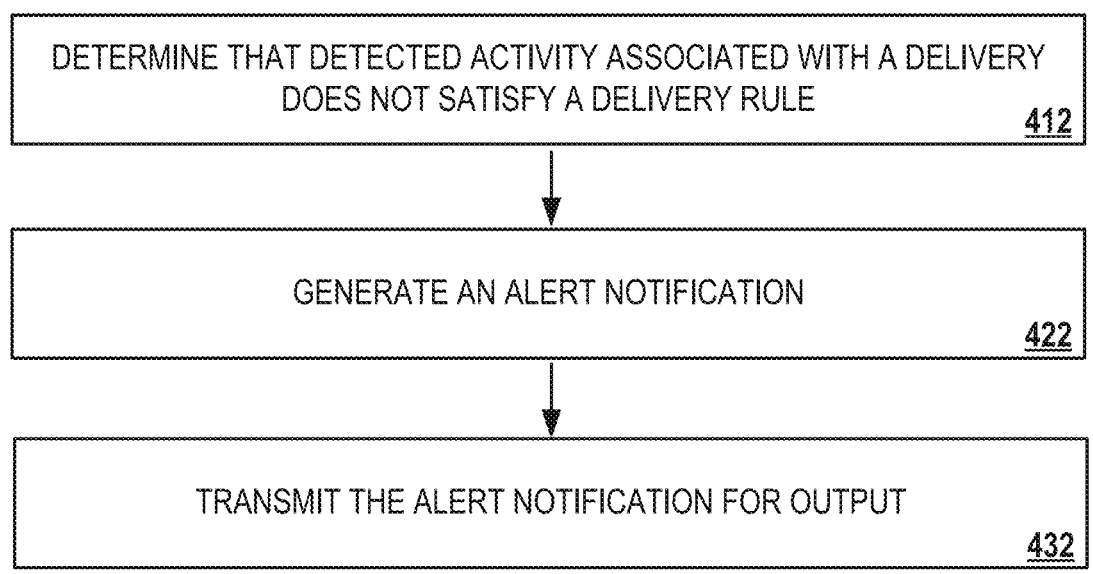
FIG. 4B illustrates an example of a process for transmitting an alert notification during a supervised delivery within an indoor environment of a property.

FIG. 4B illustrates an example of a process 400B for transmitting an alert notification during a supervised delivery within an indoor environment of a property. Briefly, the process 400B can include determining that detected activity associated with a delivery does not satisfy a delivery rule (412), generating an alert notification (422), and transmitting the alert notification for output (432).

In general, the process 400B may be performed by one or more components of the systems described above in FIGS. 1A and 1B (e.g., the control unit 110, the application server 140). For example, in some implementations, one or more of the operations described below are performed remotely by the application server 140 based on data collected locally within the property 101. As described above with respect to FIG. 1A, in such implementations, the data collected by the sensors 124, the control unit 110 can be transmitted over the network 105 to the application server 140, when then processes and aggregates the collected data in order to perform the operations described below. Alternatively, in other implementations, the operations described below are provided locally by the control unit 110 (or other devices that are present within the property 101). As described above with respect to FIG. 1B, in such implementations, the data collected by the operations can be performed with limited or no reliance on the application server 140.

In more detail, the process 400B can include determining that detected activity associated with a delivery does not satisfy a delivery rule (412). For instance, the application server 140 may determine that detected activity data of the operator 104 does not satisfy a delivery rule (e.g., a delivery rule included within the delivery rules 208). In some implementations, this determination can be based on obtaining activity data that is visible to a security camera that monitors a region of the property that includes the delivery route. In other implementations, this determination can be based on data collected by the sensors 124 (e.g., activity or motion data from sensors that are placed in restricted regions of the property). In one example, a delivery rule specifies that the operator 104 may remain within a specified delivery route. In response to obtaining data from a security camera indicating that the operator 104 has left the region specified by the delivery route, the application server 140 can determine that the detected activity does not satisfy the delivery rule in this example.

The process 400B can include generating an alert notification (422). For instance, the application server 140 may generate an alert notification in response to determining that the activity data of the operator 104 does not satisfy a delivery rule. In some instances, the alert notification includes an audible and/or visible alert that is provided for output to the operator 104. In other instances, the alert notification includes an alert message that is provided for output to a central monitoring station associated with the system and/or the user device 130 of the occupant 102. In some implementations, the type of alert notification that is generated and provided for output is based on, for example, a severity level of the delivery rule that has been determined to not be satisfied. For example, as described in greater detail below with respect to FIG. 4D, the application server 140 may perform a different action for a violation of a delivery rule with a high severity designation than for a violation of a delivery rule with a low severity designation.

The process 400B can include transmitting the alert notification for output (432). For instance, the application server 140 may transmit the generated alert notification for output to one or more of a device that is located within the property 101 (e.g., the control unit 110), a central monitoring station associated with the system, the user device 130, among others. In some implementations, the device that is selected to receive the alert notification is based on the delivery rule that has been determined to be violated in step 412.

Figure 4C:
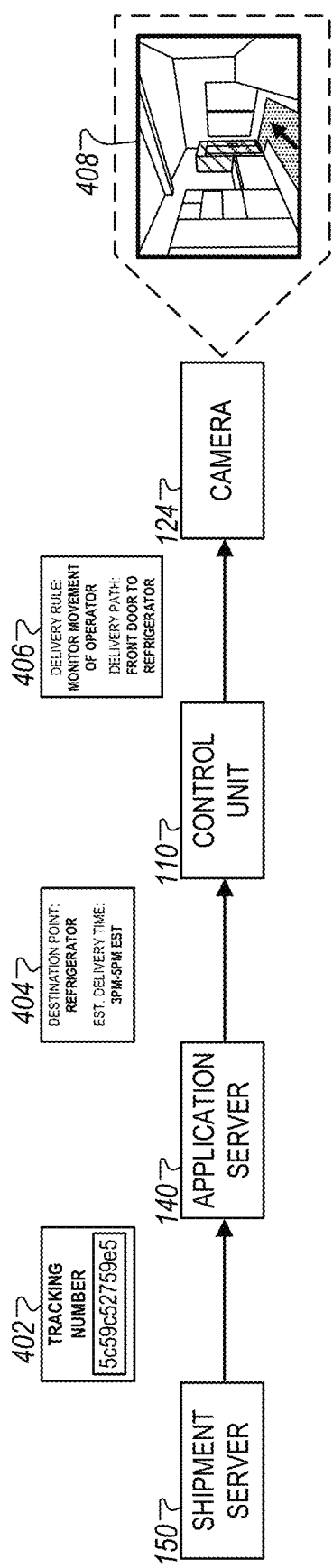
FIG. 4C illustrates an example of a technique for supervising delivery personnel along a specified delivery route within an indoor environment of a property.

FIG. 4C illustrates an example of techniques for supervising delivery personnel along a specified delivery route within an indoor environment of a property. In this example, the transmission sequence between the shipment server 150 and the camera 124 enables a system (e.g., the system 100A) to configure the camera 124 to monitor detected activity during a delivery operation at a property (e.g., the property 101). The illustrated techniques can be performed prior to the start of a delivery operation (e.g., when shipment data indicates that a package is out for delivery), or in response to a specified trigger or condition that indicates that the delivery operation has started (e.g., when the operator 104 is permitted to enter into the property 101).

As depicted, the application server 140 initially obtains shipment data 402 from the shipment server 150. The shipment data 402 includes, for instance, a unique tracking number that identifies the package to be delivery to the property 101. The application server 140 determines delivery data 404 based on the package information included within the shipment data 402. The application server 140 determines that the package to be delivered is produce with an estimated delivery time between 3 PM and 5 PM. In this example, the application server 140 also determines that the destination point for the delivery is "REFRIGERATOR" based on the package type (e.g., produce) and a time period during which the delivery operation is expected to take place at the property 101.

The control unit 110 uses the delivery data 404 to generate delivery configuration data 406. The delivery configuration data 406 includes a delivery rule that instructs the system to monitor movement of the operator 104 along a designated delivery path (e.g., "FRONT DOOR TO REFRIGERATOR"). The delivery configuration data 406 is transmitted to camera 124 to configure the camera 124 to initiate collecting a video feed 108 that includes the destination point of the delivery path (e.g., the refrigerator). As described above, during the delivery operation, the system monitors detected activity and/or movement of the operator 104 within the video feed 408 to determine, for example, if the delivery rule indicated by the delivery configuration data 406 has been violated and/or if the operator 104 has delivered the package to the correct location (e.g., based on obtaining video data indicating that the operator 104 has placed the package in the refrigerator).

Figure 4D:
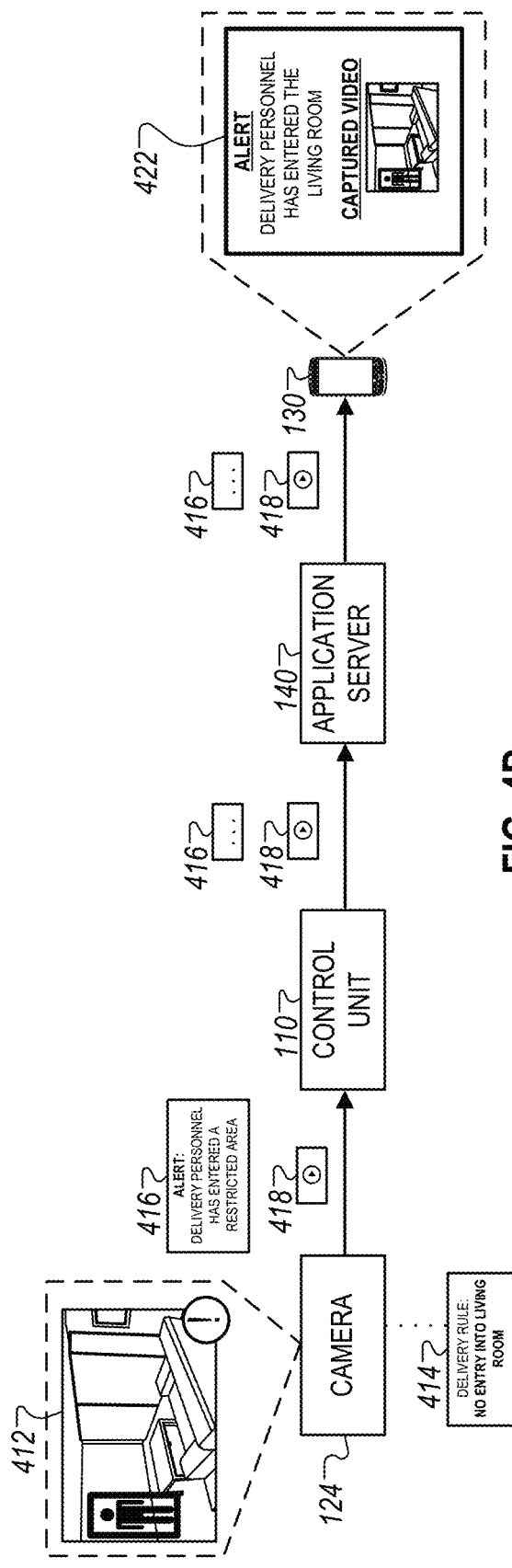
FIG. 4D illustrates an example of a process for transmitting an alert notification during a supervised delivery within an indoor environment of a property.

FIG. 4D illustrates an example of techniques for transmitting an alert notification during a supervised delivery within an indoor environment of a property. In this example, the transmission sequence between the camera 124 and the user device 130 enables a system (e.g., the system 100A) to transmit notifications in response to detecting a violation of a delivery rule. The illustrated techniques can be performed during a delivery operation (e.g., once the operator 104 has been permitted to enter into the property 101).

As depicted, the camera 124 initially collects a video feed 412 indicating that the operator 104 has entered into a living room of the property 101. The system determines, in this instance, that this activity data violates a rule 414 that designates the living room of the property 101 as a restricted region that the operator 104 is not allowed to enter during a delivery operation. In response, the system generates an alert notification 416 indicating the violation of the delivery rule 414 and transmits the alert notification 416 and video data 418 including the video feed 412 to the control unit 110, which routes the data through the application server 140 to the user device 130.

The user device 130 provides an alert notification 422 for output to the occupant 102 indicating that the occupant 104 has performed an action that is not permitted while performing the delivery operation. As shown, the alert notification 422 identifies the violation in the delivery rules (e.g., entrance into a restricted region of the property 101) and the captured video data 418 indicating the unauthorized activity.

In some implementations, the system may additionally, or alternatively, transmit the alert notification 416 and the captured to video data 418 to other entities such as a central monitoring station associated with a monitoring system of the property 101, a system associated with a local law enforcement agency, among others. In such implementations, the activity tracking and monitoring techniques described throughout can be used to protect the property 101 against any potential vulnerabilities to security breaches due to temporary access provided to the operator 104.

In some implementations, the system may perform different specified actions in response to detecting violations of different delivery rules. In such implementations, each delivery rule may be associated with a specified severity level that dictates the type of action that is performed by the system. For example, a violation of a delivery rule that is associated with a low severity level may cause the system to provide an audible notification and/or reminder to the operator 104, whereas a violation of a delivery rule that is associated with a high security level may cause the system to generate an alarm signal at the property 101 and/or transmit an alert notification to the user device 130.

In some implementations, the system may be capable of using other types of post-delivery security techniques. For example, the system may include a pressure sensor that is placed at the destination point where a package is to be placed when delivered by the operator 104. In this example, the system can determine that the package has been delivered when the pressure sensor detects the correct weight associated with the package. In another example, the system can include floor pad sensors that are capable of detecting footsteps and direction of movement based on order in which individual footsteps are detected. In addition, the system may additionally include devices that act as deterrents to protect against unauthorized entry. As examples, the system may turn on all lights after the package has been detected to be delivered, or instruct a device to play a sound upon detecting motion associated with delivery activity.

In some implementations, the system may be capable of using the techniques described above to perform live tracking of the indoor environment within the camera view of the video feed 412. For example, the system can instruct the camera 124 perform surveillance on a designated object that is viewable in the camera view. If the camera 124 detects the designated object prior to the delivery operation, but has gone missing after the completion of the delivery operation, the system may determine that there has been a security breach at the property 101.

Figure 5:
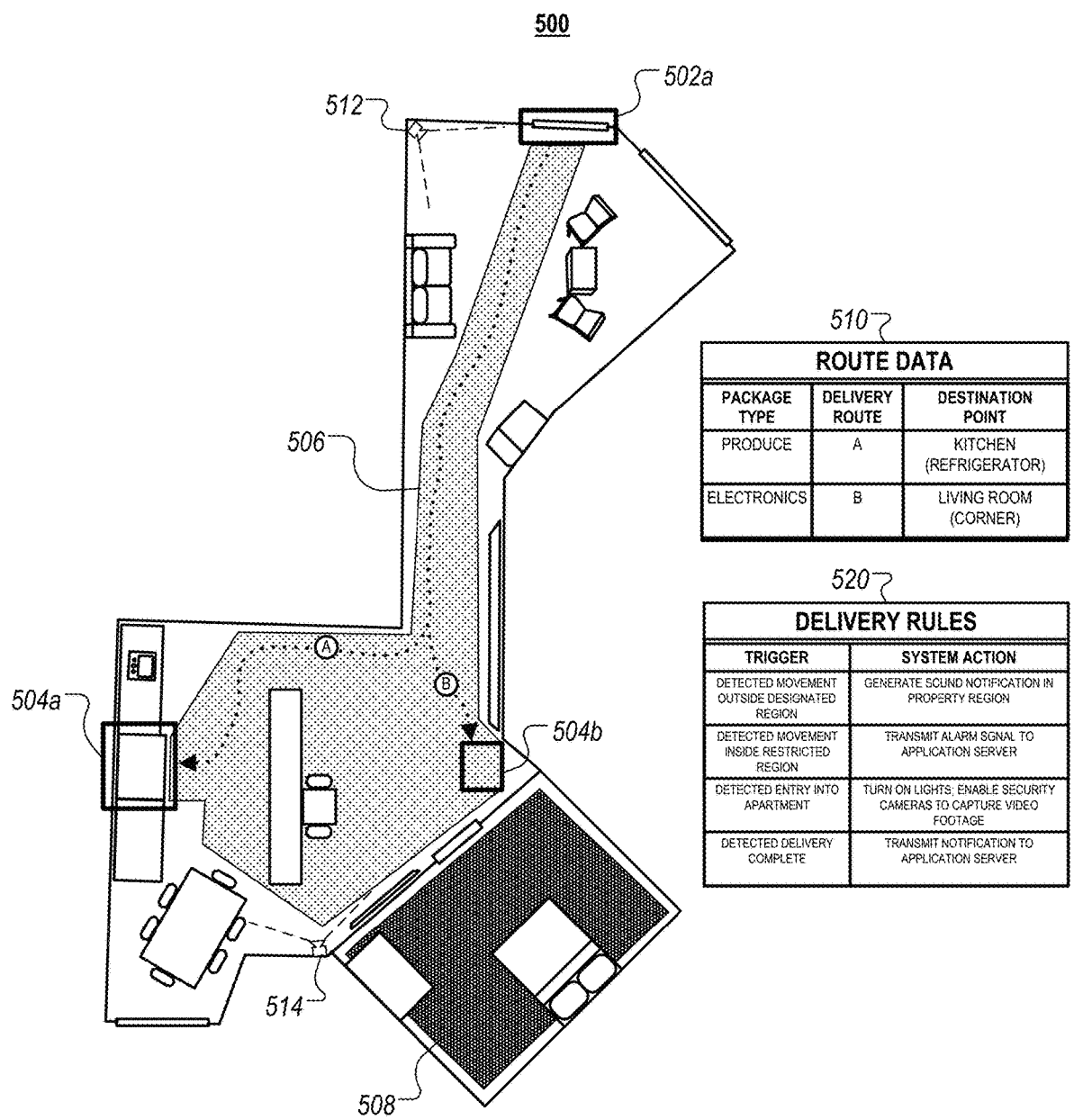
FIG. 5 illustrates an example of a two-dimensional spatial representation of a property.

FIG. 5 illustrates an example of a two-dimensional spatial representation 500 of a property (e.g., the property 101). As depicted, the spatial representation 500 includes detected objects (e.g., objects detected by the object detector 214) such as an entrance point 502*a*, destination points 504*a* and 504*b*, and furniture and fixtures that are present within the indoor environment of the property 101. The spatial representation 500 also identifies the locations of security cameras 512 and 514, which collectively monitor a delivery region 506. In this example, the delivery region 506 represents a region of the property 101 that the occupant 104 is permitted to move within during a delivery operation. In addition, the restricted region 508 represents a region of the property 101 that the occupant 104 is prohibited from entering during the delivery operation. In some instances, the two-dimensional spatial representation 500 corresponds to the two-dimensional spatial representation 206 described above with respect to FIG. 2B.

The two-dimensional spatial representation 500 can be associated with route data 510 and delivery rules 520, which enable a system (e.g., the system 100A) to monitor and/or track detected activity of the operator 104 during a delivery operation. For example, the route data 510 identifies two distinct delivery routes, which are denoted in the figure as "A" and "B." The delivery route "A" represents a first pathway from the entrance point 502*a* to the destination point 504*a*, where the destination point 504*a* represents a refrigerator. The delivery route "B" represents a second pathway from the entrance point 502*b* to the destination point 504*b*, where the destination point 504*b* represents a living room corner. As shown, the route data 510 specifies a particular delivery route based on a package type of the package to be delivered. For example, if the package to be delivered contains produce (e.g., perishable items that require refrigeration), then the system determines, based on the route data 510, that the destination point for the delivery operation is destination point 504*a* based on selecting delivery route "A." Alternatively, if the package to be delivered contains electronics, then the system determines that the destination point for the delivery operation is destination point 504*b* based on selecting delivery route "B."

The two-dimensional spatial representation 500 can also be associated with delivery rules 520, which enable the system to determine if the detected activity of the operator 104 violates a delivery rule specified within the delivery rules 520. The delivery rules 520 specify a trigger and an associated system action to be performed in response to a satisfaction of the trigger. For example, if the system determines, based on the detected activity of the operator 104 that the operator 104 has moved outside of the delivery region 506 then the system generates a sound notification within the property 101 to inform the operator 104 to return to the delivery region 506. In another example, if the system determines that the operator 104 has moved into the restricted region 508, then system transmits an alarm signal to the application server 140 (and generates an alarm condition at the property 101). In this example, the system action is more severe compared to the system action of the previous example because this delivery rule is associated with a higher severity level compared to the first delivery rule.

The delivery rules 520 also include delivery rules that enable the system to perform actions in relation to detected milestones of a delivery operation. For example, once the system determines that the operator 104 has entered into the property 101, the system turns on all lights, enables the cameras 512 and 514 to capture video footage of the delivery route 506 and monitor activity of the operator 104 within their respective camera views. In another example, once the system determines that the package has been delivered at the destination point (e.g., based on the video footage captured by the camera 514), the system transmits a notification indicating the delivery completion to the application server 140.

Figure 6:
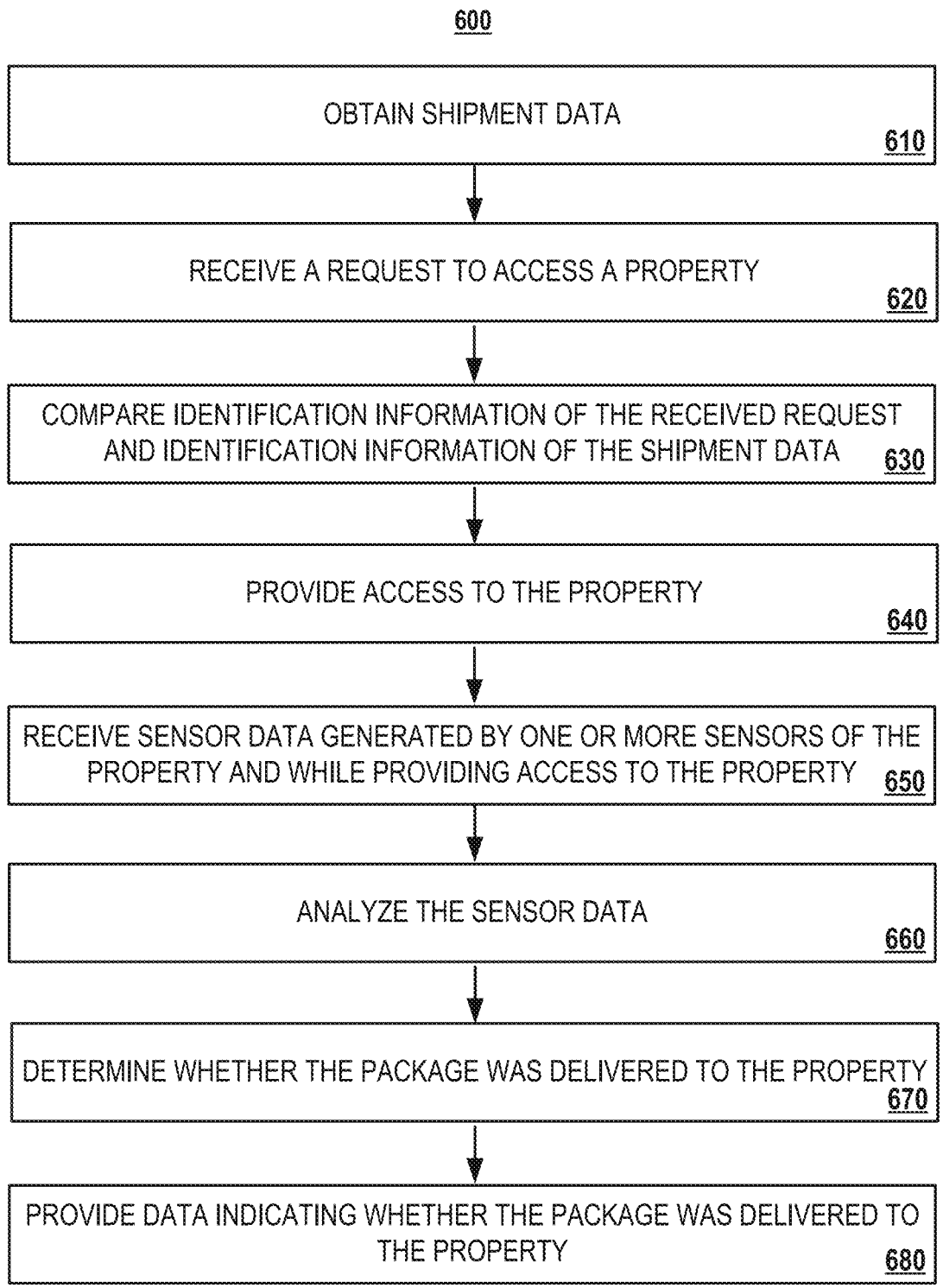
FIG. 6 illustrates an example of a process for supervising a delivery of a package within a property.

FIG. 6 illustrates an example of a process 600 for supervising a delivery of a package within a property. Briefly, the process 600 can include the operations of obtaining shipment data (610), receiving a request to access a property (620), comparing identification information of the received request and identification information of the shipment data (630), providing access to the property (640), receiving sensor data generated by one or more sensors of the property and while providing access to the property (650), analyzing the sensor data (660), determining whether the package was delivered to the property (670), and providing data indicating whether the package was delivered to the property (680).

In general, the process 600 is described below in reference to the system 100, although any property monitoring system can be configured to perform the operations of the process 600. For example, in some implementations, the operations of the process 600 are performed using a monitoring system that includes stationary cameras that are placed at specified locations of the property and that collect image and/or video data in relation to a supervised delivery as discussed throughout this document.

Additionally, in some implementations, the operations of the process 600 can be performed by a single component of a property monitoring system. For instance, the operations of the process 600 can be performed entirely by the control unit 110 or the application server 140. In the first example, the control unit 110 can receive shipment data from the shipment server 150 through the application server 140, collect and/or process sensor data collected by the sensors 124, and monitor activity of the delivery operator 104 during a delivery of a package at the property 101. In the second example, the application server 140 can remotely process sensor data collected by the sensors 124 and remotely monitor the activity of the delivery operator 104 during a delivery of a package at the property.

In other implementations, the operations of the process 600 can be performed by a combination of components of a property 101. For example, the control unit 110 can collect and process sensor data collected by the sensors 124 and provide the collected sensor data to the application server 140. In this example, the application server 140 can obtain the sensor data from the control unit 110 and process the sensor data to determine whether the delivery operator 104 has violated one or more delivery rules as discussed above. Additionally, the application server 140 can provide instructions to the control unit 110 to remotely control devices that are located within the property 101. For example, if the delivery operator 104 enters a restricted region of the property 101, the application server 140 can provide an instruction to the control unit 110 to play a sound notification indicating that a restricted action has been performed. The descriptions below are in reference to the control unit 110 for brevity and simplicity.

In more detail, the process 600 can include the operation of obtaining shipment data (610). For example, the control unit 110 can obtain shipment data from the shipment server 150 that indicates a package to be delivered at the property 101. The shipment data can also include identification information for a person who will deliver the package to the property 101. For example, the shipment data can include identification information for a delivery operator that is assigned to the delivery of the package to the property 101. The identification information can include a name, a portrait, an employee identification number, a telephone number, among other types of personally identifiable information that allows identity verification as discussed below.

The process 600 can include the operation of receiving a request to access the property (620). For example, the control unit 110 can receive a request for the delivery operator 104 to access the property 101 and deliver the package. The request can include identification information for the delivery operator 104. In some examples, the identification information can be a time-dependent authentication code (e.g., QR code, PIN, etc.) that is provided by the delivery operator 104 on a keypad associated with a front door of the property 101. In other examples, the identification information can be a bar code scan of an employee badge or ID that is issued by a shipment company that manages the shipment server 150.

The identification information can be received as user input provided by the delivery operator 104, or alternatively, through a mobile device that is uniquely assigned to the delivery operator 104 (e.g., a company issued smartphone or tablet computing device). In the first instance, the identification information can be a user input of a verification code that is only known by the delivery operator 104, e.g., a designated password that is specified by the user 102 or the shipment company associated with the shipment server 150. In the second instance, the identification information can be a time-dependent access code that is sent to the computing device of the delivery operator 104 as a trusted device such that verification of the time-dependent access code enables the verification of the identity of the delivery operator 104. In both instances, the identification information within the received request is compared against identification information specified within the shipment data to verify the actual identity of the delivery operator 104 and that the delivery operator 104 has been granted access to the property 101.

The process 600 can include the operation of comparing identification information of the received request to identification information of the shipment data (630). For example, the control unit 110 can compare the identification information specified within the shipment data received in step 610 to the identification information for the delivery operator 104 that is included in the request received in step 620. As discussed above, the comparison can be used to verify the identity of the delivery operator 104 and determine that the delivery operator 104 is actually the individual that is supposed to deliver the package to the property 101.

In some implementations, the control unit 110 can perform additional operations to further verify the identity of the delivery operator 104 after comparing the identification information. For instance, the control unit 110 can include a security camera placed on the exterior of the property 101 that collects video and/or images of individuals that attempt to access the property 101. In this example, the control unit 110 and/or the application server 140 may apply facial recognition techniques to images and/or video collected by the security camera to determine whether the delivery operator 104 is actually an individual that is specified within the shipment data as the individual that is supposed to deliver the package to the property 101. In this example, the shipment data can include a profile picture of the delivery personnel assigned to the delivery of the package, which is compared against the images and/or video collected by the security camera of the property 101 to verify that the delivery operator 104 is actually the delivery personnel assigned to the delivery of the package at the property 101.

In some instances, the control unit 110 and/or the application server 140 can generate a facial model for the delivery operator 104 that can be used to recognize and/or confirm the identity of the delivery operator 104 during verification as discussed above. In such instances, the facial model for the delivery operator 104 can be generated during an initial registration stage when the delivery operator 104 attempts to access the property 101 for the first time. The control unit 110 and/or the application server 140 can then store the facial model and other information collected during the registration so that identity verification can be more quickly performed if the delivery operator 104 requests to access the property 101 during a subsequent delivery operation.

The process 600 can include the operation of providing access to the property (640). For example, based on comparing the identification information in step 630, the control unit 110 can provide access to the property 101. Access can be provided in response to verifying that the delivery operator 104 that attempts to access the property 101 is the delivery operation that is specified in the shipment data as being assigned to deliver a package to the property 101. In some instances, the control unit 110 provides access by automatically unlocking an electronic lock attached to the front door of the property 101 once the identity of the delivery operator 104 has been verified. In other instances, the front door of the property 101 can have an associated display and/or keypad that the delivery operator 104 can interact with in relation to being provided with access to the property. In such instances, the control unit 110 may require the delivery operator 104 to provide additional information that verifies his/her permissions to access the property 101. For example, the delivery operator 104 may be required to submit a specified access code after the control unit 110 verifies the identification information in step 630 but prior to providing the delivery operator 104 with access to the property 101.

In some implementations, the control unit 110 only provides access to the property 101 upon receiving an instruction from the user 102 to do so. For example, after verifying the identity of the delivery operator 104 in step 630, the control unit 110 can provide a notification to the computing device 130 of the user 102. The notification can include a summary of the comparison of the identification information included in the access attempt received in step 620, and the identification information included in the shipment data received in step 610. In this example, the user 102 may be provided with an option to submit a user input that grants the delivery operator 104 with access to the property 101, or alternatively, a user input that denies the delivery operator 104 access to the property 101 and provides an instruction to instead leave the package near the exterior of the property 101.

The process 600 can include the operation of receiving sensor data generated by one or more sensors of the property and while providing access to the property (650). For example, the control unit 110 can obtain sensor data collected by the sensors 124 that are located in the property 101 and while providing access to the property 101. As discussed above, the sensor data can be used to monitor the actions of the delivery operator 104 during the delivery of the package in the property 101.

The process 600 can include the operation of analyzing the sensor data (660). For example, the control unit 110 can analyze the sensor data collected by the sensors 124 to determine if the delivery operator 104 has performed an action that violates one or more delivery rules as discussed above. As an example, a delivery rule can indicate a specified path for navigating the interior environment of the property 101 from the front door of the property 101 to a delivery location of the package within the property 101. In this example, the control unit 110 can analyze the sensor data to determine if the delivery operator 104 has deviated from the specified path and, for instance, entered into, a restricted region of the property 101 such as the bedroom. In other examples, delivery rules can provide other monitoring indicators, such as restricted actions that are prohibited from being performed within the property 101 (e.g., interacting with a valuable object within the property 101), remaining in the property 101 for greater than a threshold period of time, among others. In such examples, the control unit 110 can analyze the sensor data to determine if a violation of a delivery rule has occurred.

In some implementations, the control unit 110 performs specified actions in response to determining, based on analyzing the sensor data collected by the sensors 124, that the actions of the delivery operator 104 violates one or more delivery rules. For example, if the delivery operator 104 is identified as accessing a restricted region of the property 101, then the control unit 110 can generate a sound notification to indicate to the delivery operator 104 that he/she is not permitted to enter the restricted region. In another example, if the delivery operator 104 is identified as deviating from the specified delivery path, then the control unit 110 can provide an alert notification to the computing device 130 of the user 102 as a potential security breach inside the property 101. In yet another example, if the delivery operator 104 is identified has attempting to steal a movable object within the property 101, then the control unit 110 can trigger an alarm at the property 101. In these examples, delivery rules can specify different restricted actions that are associated with different severity levels. Restricted actions that are likely to have been performed due to error can result in sound notifications and/or warnings to the delivery operator 104 while he/she is inside the property 101. Alternatively, restricted actions that are likely to indicate that the delivery operator 104 poses a security threat to the property can result in more severe actions being taken by the control unit 110, e.g., triggering an alarm condition, providing an alert notification to the computing device 130, or transmitting a notification to local law enforcement to visit the property 101.

The process 600 can include the operation of determining whether the package was delivered to the property (670). For example, the control unit 110 can determine whether a package has been successfully delivered to the property 101. In some instances, the determination can be based on the delivery operator 104 scanning a bar code that is associated with the package. In such instances, the control unit 110 determines that the package has been delivered once the delivery operator 104 scans the bar code of the package and places the package inside the property 101. In some other instances, the determination can be made based on monitoring for the completion of specified events associated with a package delivery to the property 101. For example, the control unit 110 can identify that a delivery has been completed after the delivery operator 104 has been detected to leave the property 101 after being provided with access, which can be determined based on monitoring door activity and movement within the property 101.

In some implementations where the control unit 110 identifies a delivery location for a package within the property 101, the control unit 110 can determine if a package has been delivered based on monitoring for the presence of a package at the delivery location. For example, if the package to be delivered at the property 101 is produce that needs to be refrigerated, then the control unit 110 can initially determine that the delivery location of the package within the property 101 is a refrigerator in the kitchen of the property 101. In this example, the refrigerator can have a designated location where produce is placed and an associated presence sensor that indicates when an object has been placed in the designated location. In this example, the control unit 110 can determine whether the package has been delivered to the property 101 based on receiving sensor data collected by the refrigerator sensor that indicates that produce has been placed in the designated location of the refrigerator after a time period when the delivery operator 104 was provided with access to the property 101. In some instances, the operation in step 670 can also involve determining whether a package was delivered to the correct location within the property 101. For example, if the delivery operator 104 incorrectly leaves produce on the dining room table, then the control unit 110 can determine that the package was delivered to the property 101 but was delivered to the incorrect delivery location. In this example, the control unit 110 can identify the delivered location of the package by, for instance, monitoring the activity and/or movement of the delivery operator 104 within the property 101 during the delivery, using video footage collected by interior security cameras to determine where the package may have been placed, and/or using other types of sensor events that may indicate the location of the package within the property 101.

The process 600 can include the operation of providing data indicating whether the package was delivered to the property (680). For example, the control unit 110 can provide data indicating delivery of the package to the property 101 to the computing device 130 of the user 102, the application server 140, the shipment server 150, or a combination thereof. The data can include, for instance, an indication as to whether the delivery was successful or unsuccessful, and other associated information for the delivery (e.g., time of delivery, duration of the delivery operation, etc.). In some instances, the data can include sensor data collected by the sensors 124 during the delivery of the package within the property 101. For example, the data can include a snapshot of video footage of the delivery operator 104 inside the property 101, visual confirmation of the package inside the property 101, or data indicating whether the delivery operator 104 followed the designated delivery route within the property 101, whether he/she accessed restricted regions of the property 101, among other types of information.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   determining that a package is to be delivered at a particular location within a property;
   determining a route to deliver the package from an entrance of the property to the particular location;
   maintaining a rule specifying a restricted action that a delivery person is prohibited from performing while at the property;
   identifying, along the route to deliver the package from the entrance of the property to the particular location, one or more devices that can assist with the delivery, wherein at least one of the one or more devices is located at a position other than the entrance and the particular location;
   providing instructions to the one or more devices i) that were identified along the route to deliver the package from the entrance of the property to the particular location, and ii) at least one of which is located at the position other than the entrance and the particular location;
   determining, using sensor data collected while the delivery person is at the property, that the rule is satisfied; and
   performing one or more automated actions in response to determining that the rule is satisfied.

2. The method of claim 1, wherein the one or more devices comprise lights along the route to deliver the package from the entrance of the property to the particular location.

3. The method of claim 2, wherein identifying one or more devices along the route to deliver the package from the entrance of the property to the particular location comprises: identifying a light in a region of the property that includes the particular location.

4. The method of claim 1, wherein at least one of the one or more devices comprises an electronic lock along the route to deliver the package from the entrance of the property to the particular location.

5. The method of claim 1, wherein determining a route to deliver the package from the entrance of the property to the particular location comprises:
   obtaining a floorplan of the property; and
   determining the route using the floorplan of the property.

6. The method of claim 5, wherein determining a route to deliver the package from the entrance of the property to the particular location using the floorplan of the property comprises:
   identifying, in the floorplan of the property, obstructions and pathways between the entrance of the property and the particular location; and
   determining the route using the obstructions and the pathways identified between the entrance of the property and the particular location.

7. The method of claim 1, wherein determining that a package is to be delivered at a particular location within a property comprises:
   determining a type of the package; and
   determining the particular location within the property using the type of the package that was determined.

8. A system comprising:
   one or more computers and one or more storage devices storing instructions that are operable, when executed by the one or more computers, to cause the one or more computers to perform operations comprising:
   determining that a package is to be delivered at a particular location within a property;
   determining a route to deliver the package from an entrance of the property to the particular location;
   maintaining a rule specifying a restricted action that a delivery person is prohibited from performing while at the property
   identifying, along the route to deliver the package from the entrance of the property to the particular location, one or more devices that can assist with the delivery, wherein at least one of the one or more devices is located at a position other than the entrance and the particular location;
   providing instructions to the one or more devices i) that were identified along the route to deliver the package from the entrance of the property to the particular location, and ii) at least one of which is located at the position other than the entrance and the particular location;
   determining, using sensor data collected while the delivery person is at the property, that the rule is satisfied; and
   performing one or more automated actions in response to determining that the rule is satisfied.

9. The system of claim 8, wherein the one or more devices comprise lights along the route to deliver the package from the entrance of the property to the particular location.

10. The system of claim 9, wherein identifying one or more devices along the route to deliver the package from the entrance of the property to the particular location comprises:
    identifying a light in a region of the property that includes the particular location.

11. The system of claim 8, wherein the one or more devices comprises an electronic lock along the route to deliver the package from the entrance of the property to the particular location.

12. The system of claim 8, wherein determining a route to deliver the package from the entrance of the property to the particular location comprises:
    obtaining a floorplan of the property; and
    determining the route using the floorplan of the property.

13. The system of claim 12, wherein determining a route to deliver the package from the entrance of the property to the particular location using the floorplan of the property comprises:
    identifying, in the floorplan of the property, obstructions and pathways between the entrance of the property and the particular location; and
    determining the route using the obstructions and the pathways identified between the entrance of the property and the particular location.

14. The system of claim 8, wherein determining that a package is to be delivered at a particular location within a property comprises:
    determining a type of the package; and
    determining the particular location using the type of the package.

15. A non-transitory computer-readable medium storing software comprising instructions executable by one or more computers which, upon such execution, cause the one or more computers to perform operations comprising:
    determining that a package is to be delivered at a particular location within a property;
    determining a route to deliver the package from an entrance of the property to the particular location;
    maintaining a rule specifying a restricted action that a delivery person is prohibited from performing while at the property;
    identifying, along the route to deliver the package from the entrance of the property to the particular location, one or more devices that can assist with the delivery, wherein at least one of the one or more devices is located at a position other than the entrance and the particular location;
    providing instructions to the one or more devices i) that were identified along the route to deliver the package from the entrance of the property to the particular location, and ii) at least one of which is located at the position other than the entrance and the particular location;
    determining, using sensor data collected while the delivery person is at the property, that the rule is satisfied; and
    performing one or more automated actions in response to determining that the rule is satisfied.

16. The medium of claim 15, wherein the one or more devices comprise lights along the route to deliver the package from the entrance of the property to the particular location.

17. The medium of claim 15, wherein the one or more devices comprises an electronic lock along the route to deliver the package from the entrance of the property to the particular location.

18. The medium of claim 15, wherein determining a route to deliver the package from the entrance of the property to the particular location comprises:
    obtaining a floorplan of the property; and
    determining the route using the floorplan of the property.

19. The medium of claim 18, wherein determining a route to deliver the package from the entrance of the property to the particular location using the floorplan of the property comprises:
    identifying, in the floorplan of the property, obstructions and pathways between the entrance of the property and the particular location; and
    determining the route using the obstructions and the pathways identified between the entrance of the property and the particular location.

20. The method of claim 1, wherein the rule i) identifies one or more regions of the property that are defined by boundaries and ii) indicates that movement through any of the boundaries is a restricted action.

* * * * *